(12) United States Patent
Lee et al.

(10) Patent No.: US 10,936,126 B2
(45) Date of Patent: Mar. 2, 2021

(54) DISPLAY DEVICE

(71) Applicant: SAMSUNG DISPLAY CO., LTD., Yongin-si (KR)

(72) Inventors: Jin Hyeong Lee, Hwaseong-si (KR); Su Jeong Kim, Yongin-si (KR); Jong Ho Son, Seoul (KR); Mi Hwa Lee, Seoul (KR); Yun Ho Lee, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/376,829

(22) Filed: Apr. 5, 2019

(65) Prior Publication Data
US 2020/0133414 A1 Apr. 30, 2020

(30) Foreign Application Priority Data
Oct. 30, 2018 (KR) .......................... 10-2018-0130345

(51) Int. Cl.
*G06F 3/044* (2006.01)
*G06K 9/00* (2006.01)

(52) U.S. Cl.
CPC ......... *G06F 3/044* (2013.01); *G06K 9/00087* (2013.01)

(58) Field of Classification Search
CPC ............................ G06F 3/044; G06K 9/00087
See application file for complete search history.

(56) References Cited

U.S. PATENT DOCUMENTS

| 2015/0331508 | A1* | 11/2015 | Nho ...................... H01L 27/323 345/173 |
| 2016/0218156 | A1* | 7/2016 | Shedletsky ......... H01L 51/5271 |
| 2016/0231615 | A1 | 8/2016 | Nam et al. |
| 2016/0266695 | A1* | 9/2016 | Bae .................... G06K 9/00053 |
| 2020/0089034 | A1* | 3/2020 | Liu ..................... G02F 1/13471 |

* cited by examiner

*Primary Examiner* — Peter D McLoone
(74) *Attorney, Agent, or Firm* — F. Chau & Associates, LLC

(57) ABSTRACT

A display includes a substrate, a plurality of subpixels disposed on the substrate and that include organic light-emitting layers, pixel defining films disposed between the subpixels that partition the subpixels, black matrices disposed on the pixel defining films, where the black matrices absorb visible light and emit infrared light; and a sensor layer that receives infrared light emitted by the black matrices and reflected from an external object.

20 Claims, 30 Drawing Sheets

DISPLAY DEVICE

This application claims priority under 35 U.S.C. § 119 from, and the benefit of, Korean Patent Application No. 10-2018-0130345, filed on Oct. 30, 2018 in the Korean Intellectual Property Office, the contents of which are herein incorporated by reference in their entirety.

BACKGROUND

1. Technical Field

Embodiments of the present disclosure are directed to a display device.

2. Discussion of the Related Art

Display devices have become increasingly important in accordance with developments in multimedia technology. Accordingly, various types of display devices, such as liquid crystal display (LCD) devices, organic light-emitting display devices, etc., have been used.

An organic light-emitting display device displays an image using light-emitting diodes (OLEDs), which generate light through the recombination of electrons and holes. An organic light-emitting display device has a fast response speed, high luminance, wide viewing angle, and low power consumption.

Recently, research and development have been conducted into ways to integrate sensors for touch recognition or for fingerprint recognition into a display panel, which normally occupies the largest area of a mobile information communication device.

SUMMARY

Exemplary embodiments of the present disclosure provide a display device that can incorporate fingerprint recognition sensors without requiring a separate external light source.

According to an embodiment of the present invention, there is provided a display device. The display device includes: a substrate; a plurality of subpixels disposed on the substrate that include organic light-emitting layers; pixel defining films disposed between the subpixels that partition the subpixels; black matrices disposed on the pixel defining films, where the black matrices absorb visible light and emit infrared light; and a sensor layer that receives infrared light emitted by the black matrices and reflected from an external object.

According to another embodiment of the present invention, there is provided a display device. The display device includes: a substrate; a plurality of subpixels disposed on the substrate that include organic light-emitting layers; pixel defining films disposed between the subpixels that partition the subpixels; black matrices disposed on the pixel defining films, where the black matrices absorb visible light and emit infrared light; and a first sensor layer disposed below the substrate that receives infrared light emitted by the black matrices and reflected from an external object.

According to another embodiment of the present invention, there is provided a display device. The display device includes: a substrate; a light emitting layer disposed on the substrate that includes a plurality of subpixels that emit visible light; a black matrix layer disposed on the light emitting layer that includes a plurality of black matrices disposed between subpixels, wherein the black matrices absorb visible light and emit infrared light; and a sensor layer disposed below black matrix layer includes a plurality of fingerprint recognition sensors that are infrared sensors that receive infrared light emitted by the black matrices and reflected from an external object.

According to the aforementioned and other exemplary embodiments of the present disclosure, since black matrices can absorb visible light and emit infrared light and infrared fingerprint recognition sensors are disposed below the black matrices, fingerprint recognition can be performed without a separate light source.

DETAILED DESCRIPTION

Figure 1:
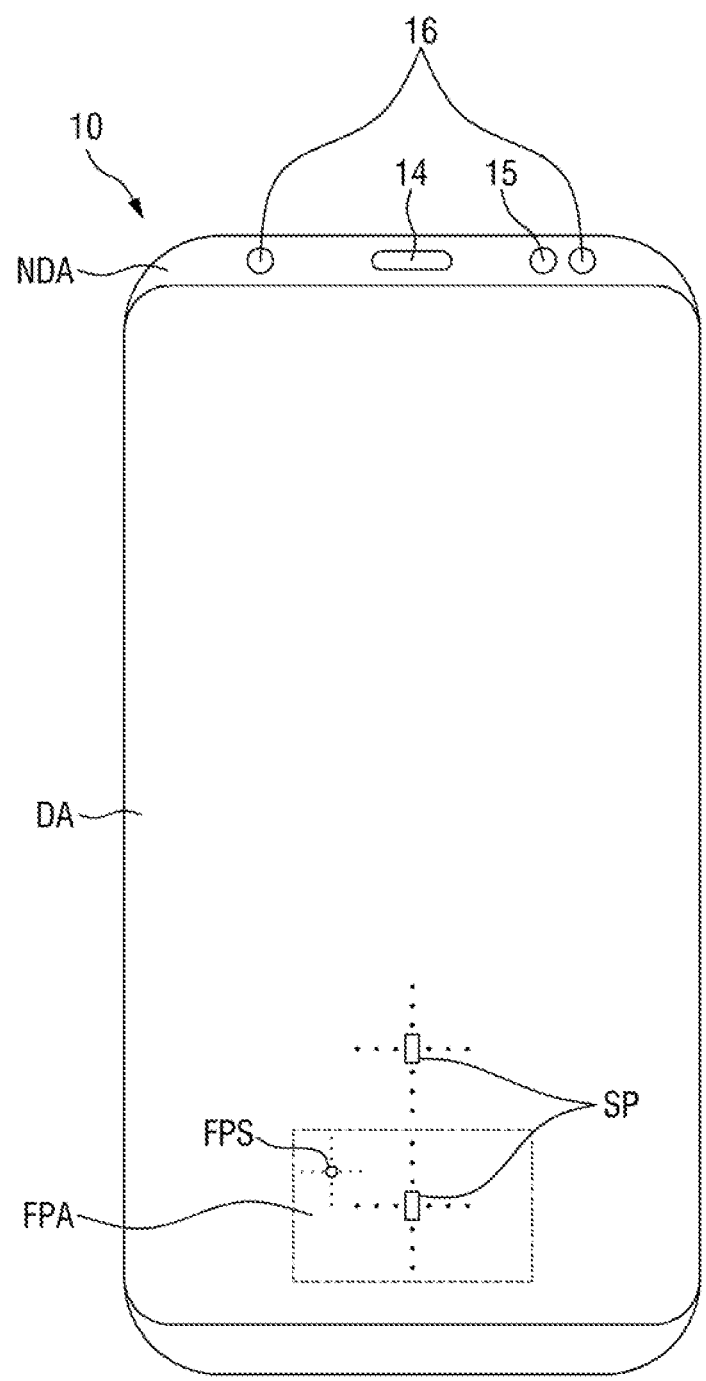
FIGS. 1 and 2 are plan views of a display device according to an exemplary embodiment of the present disclosure.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Like reference numerals may refer to like elements throughout the specification.

It will be understood that when an element or layer is referred to as being "on", "connected to" or "coupled to" another element or layer, it can be directly on, connected or coupled to the other element or layer or intervening elements or layers may be present.

The same or similar parts throughout the specification may be denoted by the same reference numerals.

Exemplary embodiments of the present disclosure will hereinafter be described with reference to the accompanying drawings.

Figure 2:
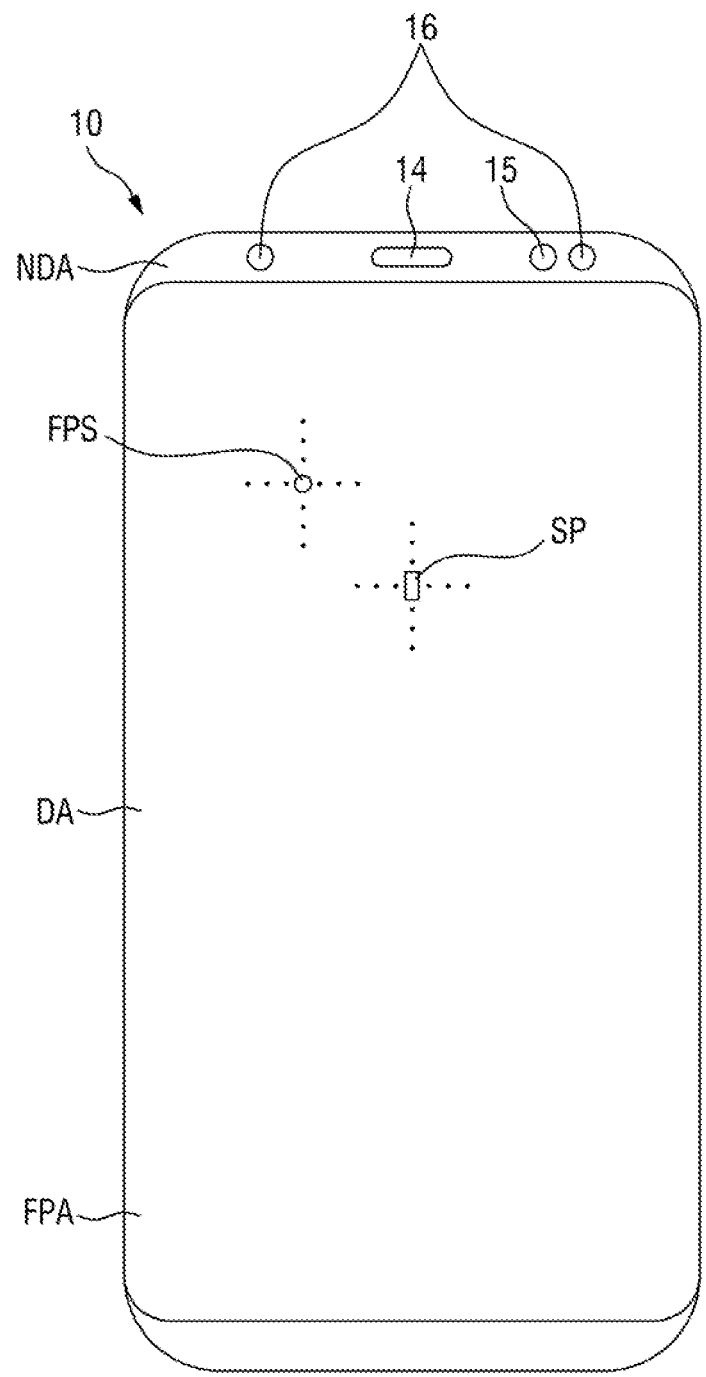

FIGS. 1 and 2 are plan views of a display device according to an exemplary embodiment of the present disclosure.

Referring to FIG. 1, according to an exemplary embodiment, a display device 10 is divided into a display area DA and a non-display area NDA.

According to an exemplary embodiment, display area DA is an area in which an image is displayed, and a plurality of subpixels SP are disposed in the display area DA. The display area DA can be used as a detector that detects an external environment. In an exemplary embodiment, at least part of the display area DA is a fingerprint recognition area FPA that can recognize a fingerprint of a user. That is, the fingerprint recognition area FPA includes subpixels SP and a plurality of fingerprint recognition sensors FPS. That is, the fingerprint recognition area FPA can display an image and can be used to recognize a user's fingerprint, if necessary.

According to an exemplary embodiment, the non-display area NDA is disposed outside of the display area DA and is an area in which no image is displayed. In the non-display area DA, a speaker module 14, a camera module 15, and a sensor module 16 can be disposed. In one exemplary embodiment, the sensor module 16 may, for example, include at least one of an illuminance sensor, a proximity sensor, an infrared sensor, and an ultrasonic sensor. In an exemplary embodiment, the sensor module 16 can recognize the iris of a user. However, embodiments are not limited thereto, and other arrangements of the speaker module 14, the camera module 15, and the sensor module 16 are possible in other embodiments.

In an exemplary embodiment, the display area DA is flat, but embodiments are not limited thereto. In another embodiment, at least part of the display area DA is bent. In addition, in another embodiment, the display area DA extends into an edge area of the display device 10.

Referring to FIG. 2, according to an exemplary embodiment, the fingerprint recognition area FPA is in substantially the same region as the display area DA. For example, the display area DA and the fingerprint recognition area FA can coincide with each other. In this example, a fingerprint recognition function is provided over the entire display area DA.

According to an exemplary embodiment, each of the fingerprint recognition sensors FPS uses an organic light-emitting diode (OLED) included with at least one subpixel SP as a light source for performing fingerprint recognition. To this end, each of the fingerprint recognition sensors FPS is disposed adjacent to at least one subpixel SP, but embodiments of the present disclosure are not limited thereto. In another embodiment, each of the fingerprint recognition sensors FPS at least partially overlaps a single pixel PXL.

According to an exemplary embodiment, since the fingerprint sensor area FPA, which includes a plurality of fingerprint recognition sensors FPS, is provided in the display area DA, a fingerprint recognition function can be provided in the display area DA. In addition, since the so display device 10 recognizes a user's fingerprint using light emitted from the subpixels SP, fingerprint recognition can be realized without a separate external light source. Therefore, a thickness of the display device 10 that can recognize fingerprints can be reduced, and the manufacturing cost of the display device 10 can be reduced.

An embodiment in which the fingerprint recognition area FPA is part of the display area DA will hereinafter be described, but embodiments of the present disclosure are not limited thereto.

Figure 3:
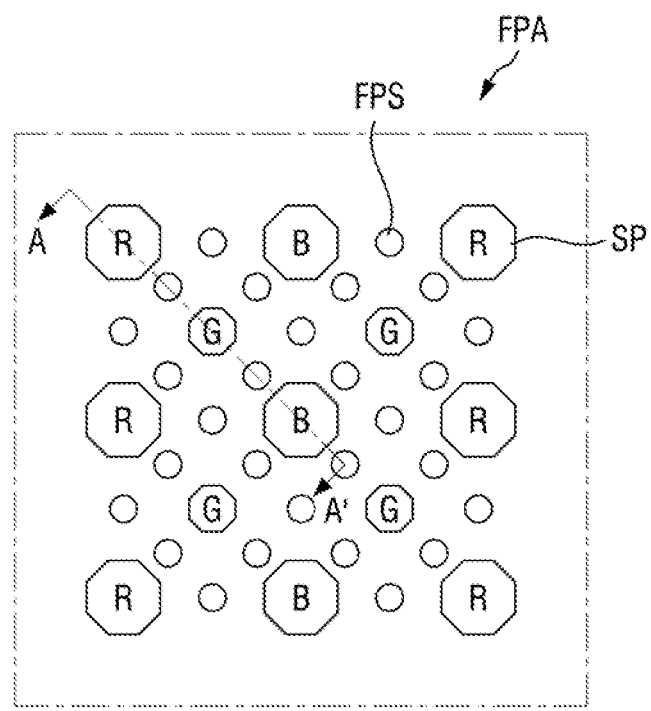
FIGS. 3 and 4 are plan views of a fingerprint recognition area according to an exemplary embodiment of the present disclosure.
Figure 4:
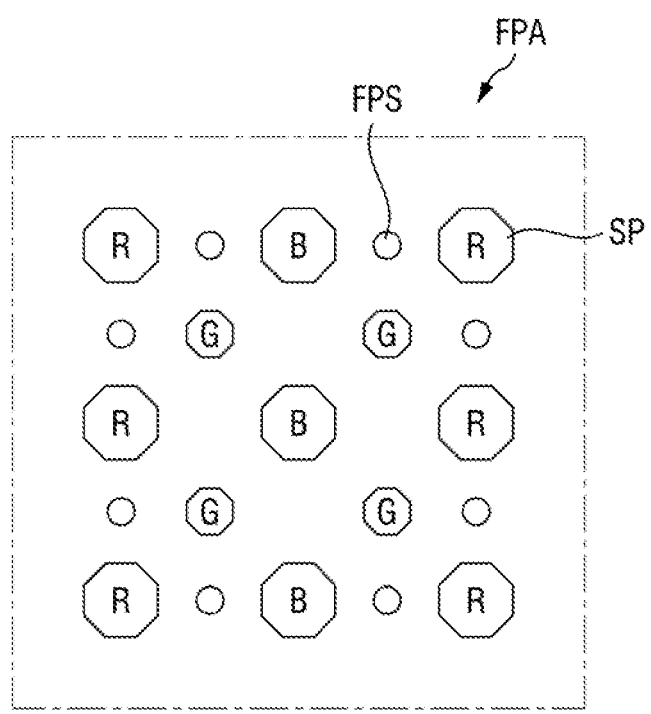

FIGS. 3 and 4 are plan views of a fingerprint recognition area according to an exemplary embodiment of the present disclosure.

Referring to FIGS. 3 and 4, according to an exemplary embodiment, a plurality of subpixels SP and a plurality of fingerprint recognition sensors FPS are disposed in a fingerprint recognition area FPA. The subpixels SP include blue subpixels B, red subpixels R, and green subpixels G.

According to an exemplary embodiment, the blue subpixels B have the same area as the red subpixels R, and the blue subpixels B and the red subpixels R have a larger area than the green subpixels G. However, embodiments of the present disclosure are not limited thereto. In another embodiment, the blue subpixels B have a larger area than the red subpixels R, and the red subpixels R have a larger area than the green subpixels G.

According to an exemplary embodiment, the red subpixels R, the green subpixels G, and the blue subpixels B have an octagonal shape in a plan view, but embodiments of the present disclosure are not limited thereto. In another embodiment, the red subpixels R, the green subpixels G, and the blue subpixels B have another polygonal shape, or a circular or an elliptical shape in a plan view.

According to an exemplary embodiment, the fingerprint recognition sensors FPS are disposed between the subpixels SP. For example, as illustrated in FIG. 3, the fingerprint recognition sensors FPS are disposed between all the subpixels SP, but embodiments of the present disclosure are not limited thereto. In another embodiment, as illustrated in FIG. 4, the fingerprint recognition sensors FPS are disposed between only some of the subpixels SP. The fingerprint recognition sensors FPS are illustrated as not overlapping the subpixels SP, but embodiments of the present disclosure are not limited thereto. In another embodiment, the fingerprint recognition sensors FPS partially overlap the subpixels SP. The size, number, resolution, location, and/or arrangement of fingerprint recognition sensors FPS can vary depending on various factors, such as the amount of light, resolution, and crosstalk needed for the fingerprint recognition sensors FPS to perform fingerprint recognition.

Figure 5:
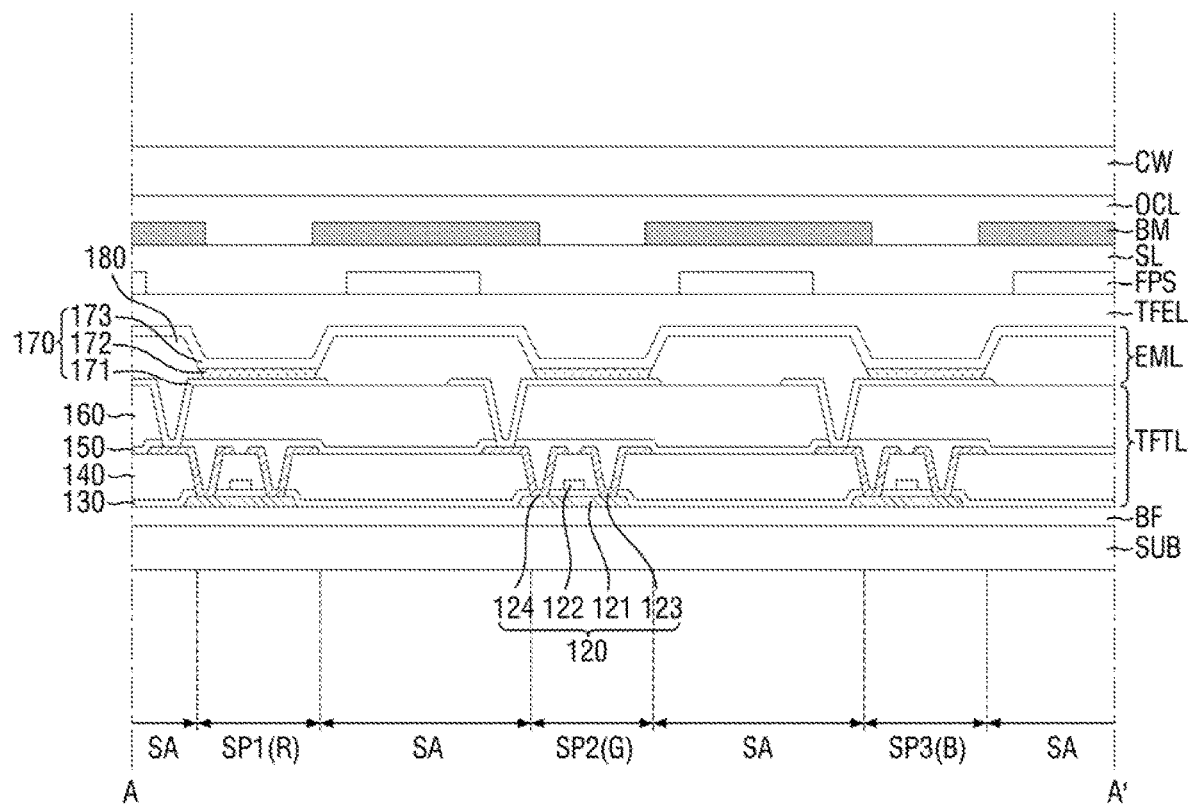
FIG. 5 is a cross-sectional view taken along line A-A' of FIG. 3.

FIG. 5 is a cross-sectional view taken along line A-A' of FIG. 3.

Referring to FIG. 5, according to an exemplary embodiment, a thin-film transistor (TFT) layer TFTL is disposed on a substrate SUB. The TFT layer TFTL includes TFTs 120, a gate insulating film 130, an interlayer insulating film 140, a passivation film 150, and a planarization film 160.

According to an exemplary embodiment, a buffer film BF is disposed on the substrate SUB. The buffer film BF protects the TFTs 120 and organic light-emitting layers 172 of a light-emitting element layer EML against moisture that penetrates the substrate SUB, which is highly susceptible to moisture. The buffer film BF includes a plurality of inorganic films that are alternately stacked. For example, the buffer film BF can be a multilayer film in which one or more inorganic films such as a silicon nitride layer, a silicon oxynitride layer, a silicon oxide layer, a titanium oxide layer, or an aluminum oxide layer are alternately stacked. In other embodiments, the buffer film BF can be omitted.

According to an exemplary embodiment, the TFTs 120 are disposed on the buffer film BF. Each TFT 120 includes an active layer 121, a gate electrode 122, a source electrode 124 and a drain electrode 123. FIG. 5 illustrates top gate-type TFTs in which the gate electrodes 122 are disposed above the active layers 121, but embodiments of the present disclosure are not limited thereto. In another embodiment, the TFTs 120 are bottom gate-type TFTs in which the gate electrodes 122 are disposed below the active layers 121, or double gate-type TFTs in which the gate electrodes 122 are disposed both above and below the active layers 121.

According to an exemplary embodiment, the active layers 121 are disposed on the buffer film BF. The active layers 121 may include polycrystalline silicon, monocrystalline silicon, low-temperature polycrystalline silicon, or an oxide semiconductor. For example, the oxide semiconductor may be a binary compound (ABx), a ternary compound (ABxCy), or a quaternary compound (ABxCyDz) that includes indium (In), zinc (Zn), gallium (Ga), tin (Sn), titanium (Ti), aluminum (Al), hafnium (Hf), zirconium (Zr), or magnesium (Mg). For example, the active layers 121 may include indium tin zinc oxide (ITZO) or indium gallium zinc oxide (IGZO). A light-shielding layer that shields the active layers 121 from external light incident thereon may be disposed between the buffer layer BF and the active layers 121.

According to an exemplary embodiment, the gate insulating film 130 is disposed on the active layers 121. The gate insulating film 130 includes an inorganic film, such as a silicon nitride layer, a silicon oxynitride layer, a silicon oxide layer, a titanium oxide layer, or an aluminum oxide layer.

According to an exemplary embodiment, the gate electrodes 122 and gate lines are disposed on the gate insulating film 130. The gate electrodes 122 and the gate lines may be formed as a single-layer or a multilayer film using molybdenum (Mo), Al, chromium (Cr), gold (Au), Ti, nickel (Ni), neodymium (Nd), copper (Cu), or an alloy thereof.

According to an exemplary embodiment, the interlayer insulating film 140 is disposed on the gate electrodes 122 and the gate lines. The interlayer insulating film 140 includes an inorganic film, such as a silicon nitride layer, a silicon oxynitride layer, a silicon oxide layer, a titanium oxide layer, or an aluminum oxide layer.

According to an exemplary embodiment, the source electrodes 124 and the drain electrodes 123 are disposed on the interlayer insulating film 140. The source electrodes 124 and the drain electrodes 123 are connected to the active layers 121 via contact holes that penetrate the gate insulating film 130 and the interlayer insulating film 140. The source electrodes 124 and the drain electrodes 123 may be formed as single-layer or multilayer films using Mo, Al, Cr, Au, Ti, Ni, Nd, Cu, or an alloy thereof.

According to an exemplary embodiment, the passivation film 150 is disposed on the source electrodes 124 and the drain electrodes 123 and insulates the TFTs 120. The passivation film 150 includes an inorganic film, such as a silicon nitride layer, a silicon oxynitride layer, a silicon oxide layer, a titanium oxide layer, or an aluminum oxide layer.

According to an exemplary embodiment, the planarization film 160 is disposed on the passivation film 150 and planarizes height differences formed by the TFTs 120. The planarization film 160 includes an organic film formed of an acrylic resin, an epoxy resin, a phenolic resin, a polyamide resin, or a polyimide resin.

According to an exemplary embodiment, a light-emitting element layer EML is disposed on the TFT layer TFTL. The light-emitting element layer EML includes light-emitting elements 170 and pixel defining films 180.

According to an exemplary embodiment, the light-emitting elements 170 and the pixel defining films 180 are disposed on the planarization film 160. The light-emitting elements 170 include first electrodes 171, the organic light-emitting layers 172, and a second electrode 173.

According to an exemplary embodiment, the first electrodes 171 are disposed on the planarization film 160. The first electrodes 171 are connected to the source electrodes 124 of the TFTs 120 via contact holes that penetrate the passivation film 150 and the planarization film 160, but embodiments of the present disclosure are not limited thereto. In another embodiment, the first electrodes 171 are connected to the drain electrodes 123 of the TFTs 120 via contact holes that penetrate the passivation film 150 and the planarization film 160.

According to an exemplary embodiment, in a top emission structure in which light is emitted in a direction from the organic light-emitting layers 172 toward the second electrode 173, the first electrodes 171 are formed of a highly reflective metal, such as a stack of aluminum and titanium, e.g., Ti/Al/Ti, a stack of aluminum and ITO, e.g., ITO/Al/ITO, a silver-palladium-copper (APC) alloy, or a stack of an APC alloy and ITO, e.g., ITO/APC/ITO, but embodiments of the present disclosure are not limited thereto. In a bottom emission structure in which light is emitted in a direction from the organic light-emitting layers 172 toward the first electrodes 171, the first electrodes 171 are formed of a transparent conductive oxide material (TCO) that can transmit light therethrough, such as ITO or IZO or a semi-transmissive conductive material such as Mg, silver (Ag), or an alloy thereof. When the first electrodes 171 are formed of a semi-transmissive material, the emission efficiency of the display device 10 can be improved by micro cavities. Hereinafter, for convenience of description, the light-emitting elements 170 will be described as having a top emission structure in which light is emitted from the organic light-emitting layers 172 toward the second electrode 173.

According to an exemplary embodiment, the pixel defining layer 180 is disposed on the planarization layer 160 to partition the first electrodes 171 and define subpixels SP1, SP2 and SP3. The pixel defining films 180 covers the edges of the first electrodes 171. The pixel defining layer 180 includes an organic film formed of an acrylic resin, an epoxy resin, a phenolic resin, a polyamide resin, or a polyimide resin.

According to an exemplary embodiment, first, second, and third subpixels SP1, SP2, and SP3 are regions in which the first electrodes 171, the organic light-emitting layers 172, and the second electrode 173 are sequentially stacked so that holes from the first electrodes 171 and electrons from the second electrode 173 can combine together in the organic light-emitting layers 172 and thus emit light. For example, the first subpixel SP1 is a red subpixel R, the second subpixel SP2 is a green subpixel G, and the third subpixel SP3 is a blue subpixel B.

According to an exemplary embodiment, the organic light-emitting layers 172 are disposed on the first electrodes 171 and edges of the organic light-emitting layers 172 overlap the pixel defining films 180. The organic light-emitting layers 172 include an organic material and emit light of a predetermined color. For example, the organic light-emitting layers 172 includes a hole transport layer, an organic material layer, and an electron transport layer. In this example, the organic light-emitting layer 172 of the red subpixel R emits red light, the organic light-emitting layer 172 of the green subpixel G emits green light, and the organic light-emitting layer 172 of the blue subpixel B emits blue light. However, embodiments are not limited thereto, and in another embodiment, the organic light-emitting layers 172 of the first, second, and third subpixels SP1, SP2, and SP3 emit white light, in which case, the red, green, and blue subpixels R, G, and B further include red, green, and blue color filter layers, respectively.

According to an exemplary embodiment, the second electrode 173 is disposed on the organic light-emitting layers 172 and the pixel defining films 180. The second electrodes 173 cover the organic light-emitting layers 172. The second electrodes 173 are a common layer formed in common for the subpixels SP1, SP2 and SP3, and a capping layer may be disposed on the second electrode 173.

According to an exemplary embodiment, in the top emission structure, the second electrode 173 may be formed of a TCO that can transmit light therethrough, such as ITO or IZO, or a semi-transmissive conductive material such as Mg, Ag, or an alloy thereof. When the second electrode 173 is formed of a semi-transmissive metal material, the emission efficiency of the display device 10 can be improved by micro cavities.

According to an exemplary embodiment, a thin-film encapsulation layer TFEL is disposed on the light-emitting element layer EML. The thin-film encapsulation layer TFEL includes at least one inorganic film that prevents the infiltration of oxygen or moisture into the organic light-emitting layers 172 and the second electrode 173. In addition, the thin-film encapsulation layer TFEL includes at least one organic film that protects the light-emitting element layer EML against foreign materials, such as dust. For example, the thin-film encapsulation layer TFEL includes a first inorganic film disposed on the second electrode 173, an organic film disposed on the first inorganic film, and a second inorganic film disposed on the organic film. The first and second inorganic films may be silicon nitride layers, silicon oxynitride layers, silicon oxide layers, titanium oxide layers, or aluminum oxide layers, but embodiments of the present disclosure are not limited thereto. The organic film may be formed of an acrylic resin, an epoxy resin, a phenolic resin, a polyamide resin, or a polyimide resin, but embodiments of the present disclosure are not limited thereto.

According to an exemplary embodiment, a sensor layer SL is disposed on the thin-film encapsulation layer TFEL. The sensor layer SL includes the fingerprint recognition sensors FPS that can recognize a user's fingerprint. The fingerprint recognition sensors FPS are disposed to correspond to the pixel defining films 180. For example, the fingerprint recognition sensors FPS are disposed to not overlap the first, second, and third subpixels SP1, SP2, and SP3, but to overlap the pixel defining films 180, but embodiments of the present disclosure are not limited thereto. In another embodiment, the fingerprint recognition sensors FPS are disposed to partially overlap the first, second, and third subpixels SP1, SP2, and SP3, in which case, the fingerprint recognition sensors FPS overlap not only the first, second, and third subpixels SP1, SP2, and SP3, but also the pixel defining films 180.

According to exemplary embodiments, the fingerprint recognition sensors FPS are disposed between the first, second, and third subpixels SP1, SP2, and SP3. In an embodiment, the fingerprint recognition sensors FPS are disposed between all the subpixels SP1, SP2 and SP3, but embodiments of the present disclosure are not limited thereto. In another embodiment, the fingerprint recognition sensors FPS are disposed between only some of the subpixels SP1, SP2, and SP3.

According to exemplary embodiments, the fingerprint recognition sensors FPS have a larger area than the subpixels SP1, SP2 and SP3, but embodiments of the present disclosure are not limited thereto. In another embodiment, the fingerprint recognition sensors FPS have an area that is less than or equal to that of the subpixels SP1, SP2 and SP3.

According to exemplary embodiments, the fingerprint recognition sensors FPS are infrared sensors. A fingerprint includes projected ridges and recessed valleys, and the amount of time that it takes for infrared light emitted from a light source to be received by the fingerprint recognition sensors FPS or the amount of light received by the fingerprint recognition sensors FPS varies depending on whether the light is reflected by a ridge or a valley. Thus, the fingerprint recognition sensors FPS analyze the unique pattern of a fingerprint by measuring the amount of time that it takes for infrared light emitted from a light source to be received by the fingerprint recognition sensors FPS or the amount of light received by the fingerprint recognition sensors FPS. The fingerprint recognition sensors FPS are photoelectric infrared sensors that include phototransistors or photodiodes, but embodiments of the present disclosure are not limited thereto. In another embodiment, the fingerprint recognition sensors FPS are thermal infrared sensors that detect infrared light by measuring physical changes.

According to exemplary embodiments, black matrices BM are disposed on the sensor layer SL. The black matrices BM are disposed to correspond to peripheral areas SA that are located between the subpixels SP. In an embodiment, the black matrices BM are disposed on the sensor layer SL and have the same area as the peripheral areas SA, but embodiments of the present disclosure are not limited thereto. In another embodiment, the black matrices BM overlap the peripheral areas SA, but may have a smaller or larger area than the peripheral areas SA.

According to exemplary embodiments, the black matrices BM absorb visible light and transmit and emit infrared light. In an embodiment, the black matrices BM absorb visible light emitted by the subpixels SP1, SP2 and SP3 in a wavelength range of 380 nm to 770 nm, emit infrared light in a wavelength range of 800 nm to 2000 nm, and transmit infrared light in a wavelength range of 800 nm to 2000 nm reflected from a user's finger. To this end, the black matrices BM include a black organic material and quantum dots, and the central emission wavelength of the quantum dots ranges from 700 nm to 2200 nm, or from 800 nm to 2000 nm. The black matrices BM absorb light in the visible wavelength ranges and emit light in the infrared wavelength ranges.

According to exemplary embodiments, an overcoat layer OCL is disposed on the black matrices BM. The overcoat layer OCL planarizes the tops of the black matrices BM. The overcoat layer OCL is formed of an acrylic epoxy material, but embodiments of the present disclosure are not limited thereto.

According to exemplary embodiments, a cover window CW is disposed on the overcoat layer OCL. The cover window CW protects the elements of the display device 10 and transmits therethrough visible light output by the light-emitting element layer EML and infrared light output by the black matrices BM.

According to exemplary embodiments, the cover window CW includes a transparent material, such as transparent glass, polyethylene terephthalate, a polyvinyl resin, or polyester, but embodiments of the present disclosure are not limited thereto. The material of the cover window CW is not particularly limited as long as the cover window CW has sufficient transmittance to transmit therethrough visible light output by the light-emitting element layer EML and infrared light output by the black matrices BM. In addition, a polarizing plate is disposed between the cover window CW and the overcoat layer OCL.

Figure 6:
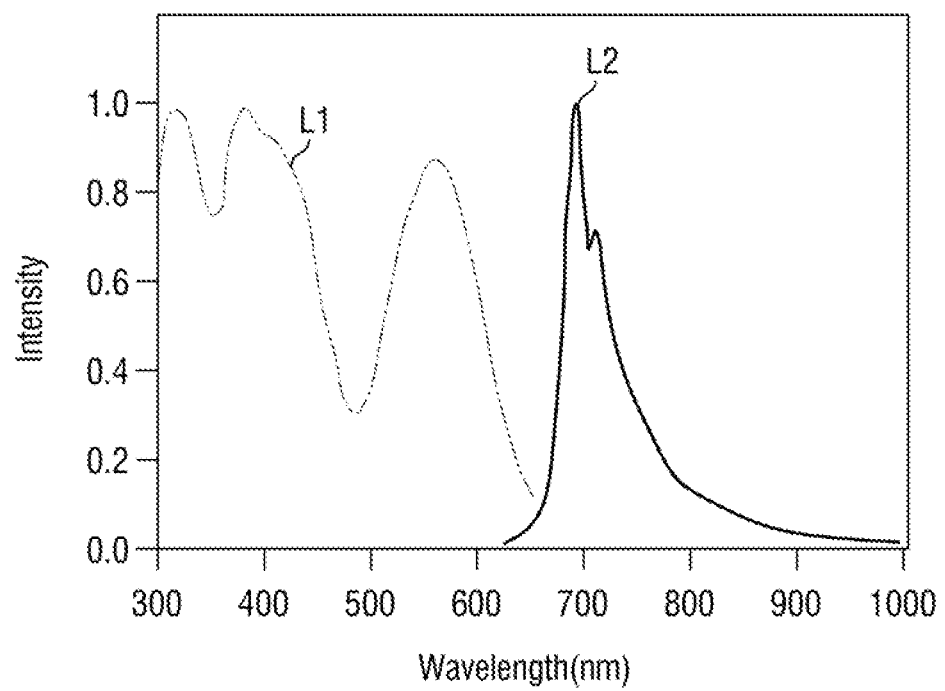
FIG. 6 is a graph showing absorption and emission by black matrices as a function of wavelength according to an exemplary embodiment of the present disclosure.
Figure 7:
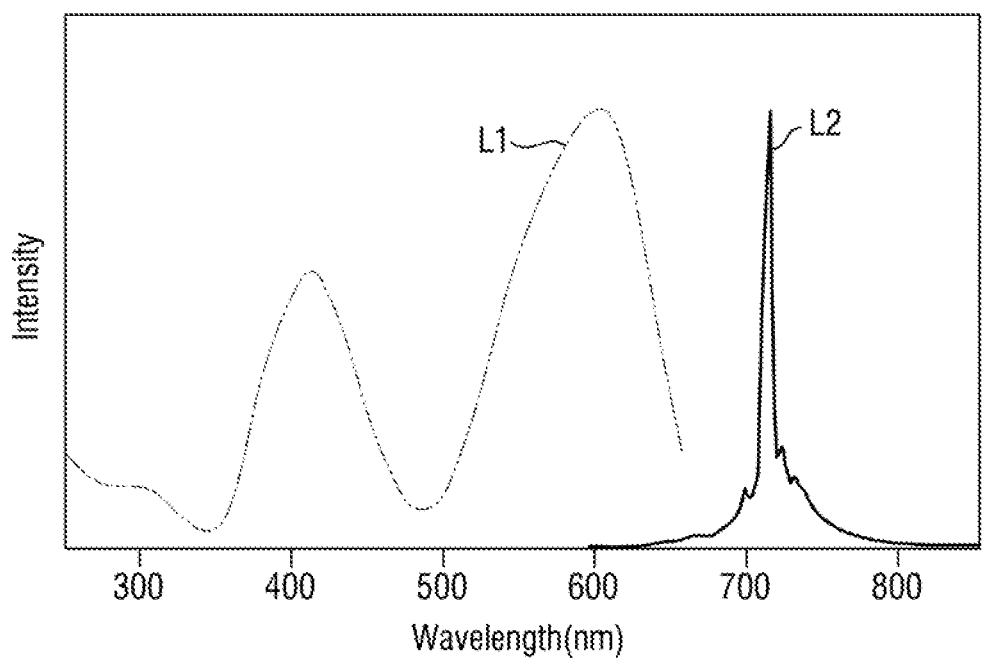
FIG. 7 is a graph showing absorption and emission by black matrices as a function of wavelength according to another exemplary embodiment of the present disclosure.

FIG. 6 is a graph showing absorption and emission by black matrices as a function of wavelength according to an exemplary embodiment of the present disclosure, and FIG. 7 is a graph showing absorption and emission by black matrices as a function of wavelength according to other exemplary embodiments of the present disclosure. Referring to FIGS. 6 and 7, the horizontal axis represents the wavelength of light, and the vertical axis represents the transmittance (%) of light in terms of the intensity of light.

According to exemplary embodiments, FIG. 6 illustrates a case where the black matrices BM include ZGGO(ZnGaGeO):Cr. Referring to FIG. 6, a first line L1 represents light absorbed by the black matrices BM, and a second line L2 represents light emitted by the black matrices BM. As illustrated in FIG. 6, the black matrices BM absorb visible light and emit infrared light.

According to exemplary embodiments, FIG. 7 illustrates a case where the black matrices BM include LGO(LaGaO):Cr. Referring to FIG. 7, a first line L1 represents light absorbed by the black matrices BM, and a second line L2 represents light emitted by the black matrices BM. As illustrated in FIG. 7, the black matrices BM absorb visible light and emit infrared light.

In the examples of FIGS. 6 and 7, the black matrices BM include ZGGO:Cr or LGO:Cr, but embodiments of the present disclosure are not limited thereto. Even when the black matrices BM contain a material that can absorb visible light and emit infrared light, the intrinsic function of the black matrices BM, i.e., that of blocking visible light emitted by the light-emitting element layer EML, is not impaired. In addition, since infrared light emitted by the black matrices BM can be used as a light source for the fingerprint recognition sensors FPS, a separate light source for the fingerprint recognition sensors FPS is not needed.

Figure 8:
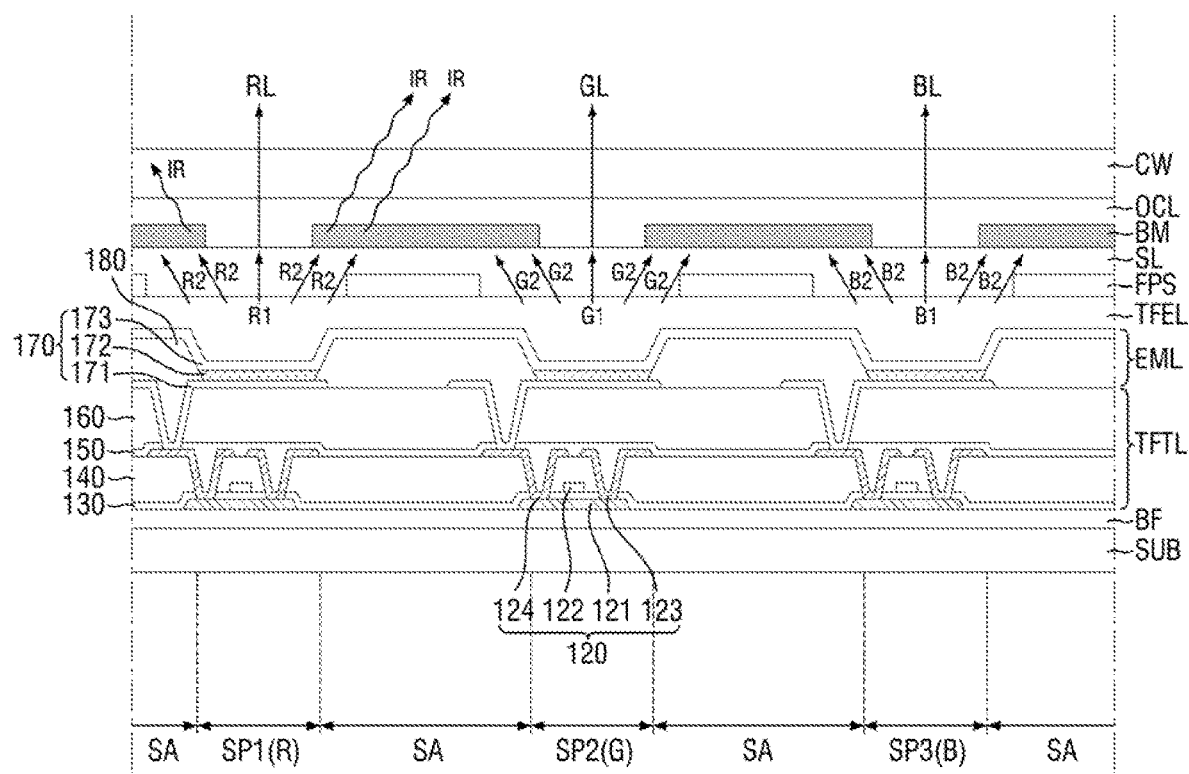
FIG. 8 is a cross-sectional view that illustrates how light is output according to an exemplary embodiment of the present disclosure.
Figure 9:
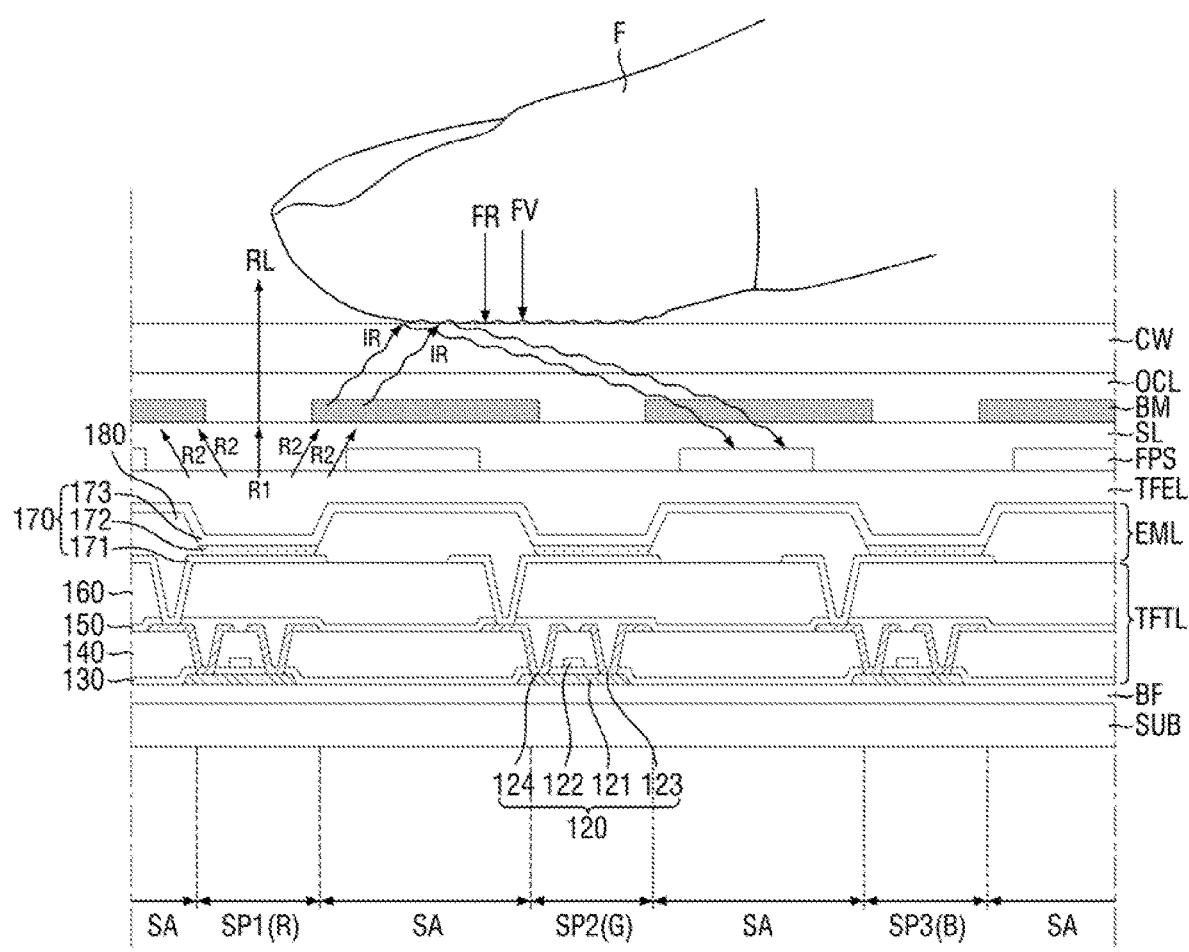
FIG. 9 is a cross-sectional view that illustrates how fingerprint recognition is performed according to an exemplary embodiment of the present disclosure.

FIG. 8 is a cross-sectional view that illustrates how light is output according to an exemplary embodiment of the present disclosure, and FIG. 9 is a cross-sectional view that illustrates how fingerprint recognition is performed according to an exemplary embodiment of the present disclosure. FIGS. 8 and 9 illustrate an example in which the black matrices BM absorb visible light and emit infrared light using red visible light.

Referring to FIG. 8, according to an exemplary embodiment, a fingerprint recognition area FPA includes subpixels SP1, SP2 and SP3 and peripheral areas SA disposed between the subpixels SP1, SP2 and SP3. The pixel defining films 180, the fingerprint recognition sensors FPS, and the black matrices BM are disposed above the peripheral areas SA. The subpixels SP1, SP2 and SP3 include first, second and third subpixels SP1, SP2 and SP3, and the first, second and third subpixels SP1, SP2 and SP3 are red, green and blue subpixels R, G and B, respectively.

According to an exemplary embodiment, red light R1 and R2 emitted by the first subpixel SP1 includes first red light R1 output to regions between the black matrices BM and second red light R2 output to the black matrices BM. The first red light R1 penetrates the overcoat layer OCL and the cover window CW and is output as red light RL, and the second red light R2 is incident upon the black matrices BM and is converted into, and output as, infrared light IR, through the overcoat layer OCL and the cover window CW.

According to an exemplary embodiment, green light G1 and G2 emitted by the second subpixel SP2 includes first green light G1 output to the regions between the black matrices BM and second green light G2 output to the black matrices BM. The first green light G1 penetrates the overcoat layer OCL and the cover window CW and is output as green light GL, and the second green light G2 is absorbed by the black matrices BM.

According to an exemplary embodiment, blue light B1 and B2 emitted by the third subpixel SP3 includes first blue light B1 output to the black matrices BM and second blue light B2 output to the black matrices BM. The first blue light B1 penetrates the overcoat layer OCL and the cover window CW and is output as blue light BL, and the second blue light B2 is absorbed by the black matrices BM.

Referring to FIG. 9, according to an exemplary embodiment, in response to a user's finger F being placed in contact with the cover window CW, infrared light IR output from the black matrices BM is reflected by ridges FR and valleys FV of the user's finger F, and the reflected infrared light is received by the fingerprint recognition sensors FPS so that the pattern of the user's fingerprint can be recognized. Since the fingerprint recognition sensors FPS are disposed between the pixel defining films 180 and the black matrices BM, the reception sensitivity of the reflected infrared light IR can be improved.

In FIG. 9, according to an exemplary embodiment, the size of the subpixels SP1, SP2 and SP3 is exaggerated as compared to the size of the user's finger F to more clearly show the subpixels SP1, SP2 and SP3 and the fingerprint recognition sensors FPS, but the actual sizes of and pitches between the subpixels SP1, SP2 and SP3 and the fingerprint recognition sensors FPS are very small as compared to the size of the user's finger F. That is, multiple subpixels SP1, SP2 and SP3 and multiple fingerprint recognition sensors FPS are disposed below the user's finger F, and the fingerprint pattern of the finger F is recognized by piecing together the output signals of the fingerprint recognition sensors FPS.

An embodiment in which the second red light R2 emitted by the first subpixel SP1 is converted into infrared light IR has been described above, but embodiments of the present disclosure are not limited thereto. In another embodiment, the second green light G2 emitted by the second subpixel SP2 is converted into infrared light IR by the black matrices BM, and the second red light R2 and the second blue light B2 emitted by the first and third subpixels SP1 and SP3, respectively, is absorbed by the black matrices BM. In another embodiment, the second blue light B2 emitted by the third subpixel SP3 is converted into infrared light IR by the black matrices BM, and the second red light R2 and the second green light G2 emitted by the first and second subpixels SP1 and SP2, respectively, is absorbed by the black matrices BM. In another embodiment, light of different colors, emitted by any two of the first, second and third subpixels SP1, SP2 and SP3, is converted into infrared light by the black matrices BM.

Figure 10:
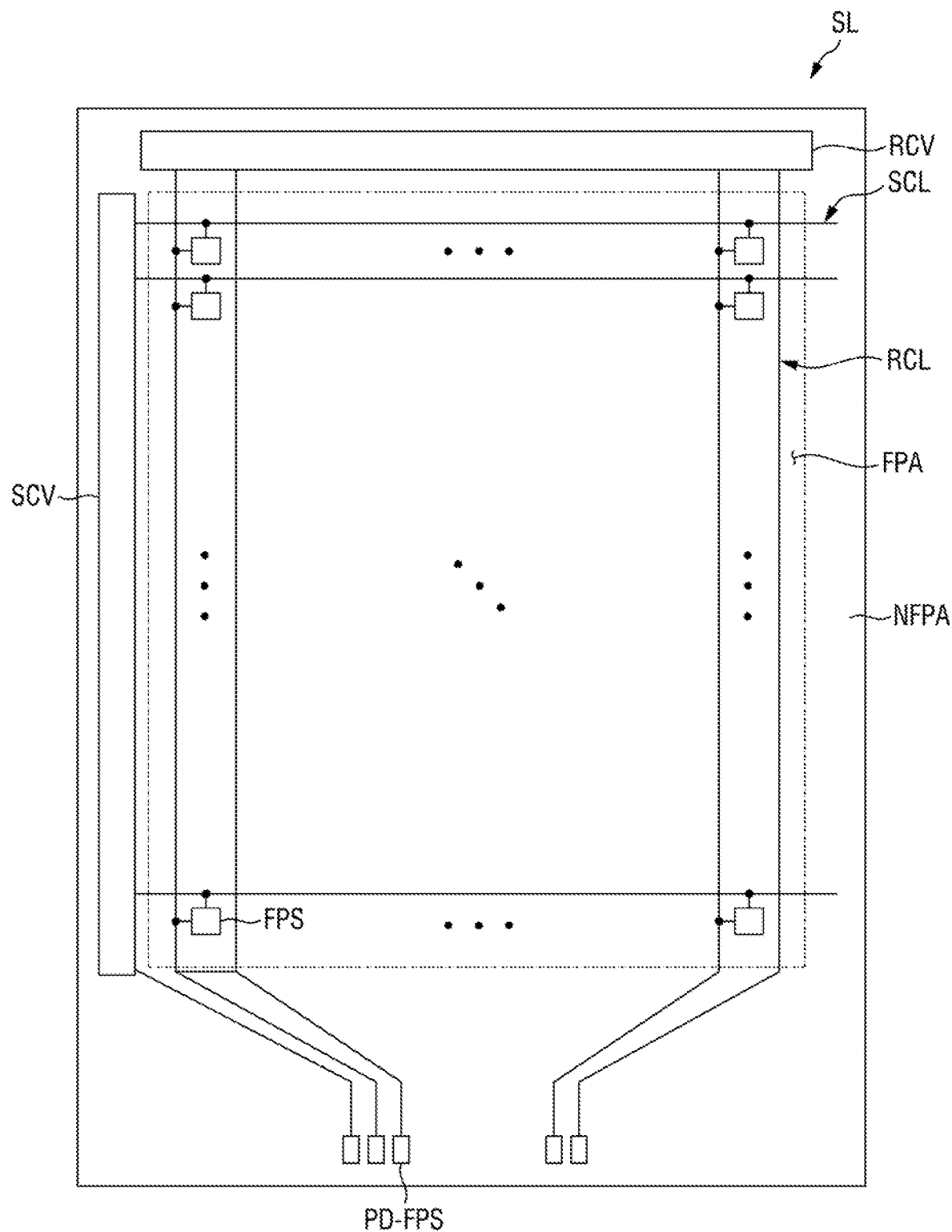
FIG. 10 is a plan view of a sensor layer according to an exemplary embodiment of the present disclosure.
Figure 11:
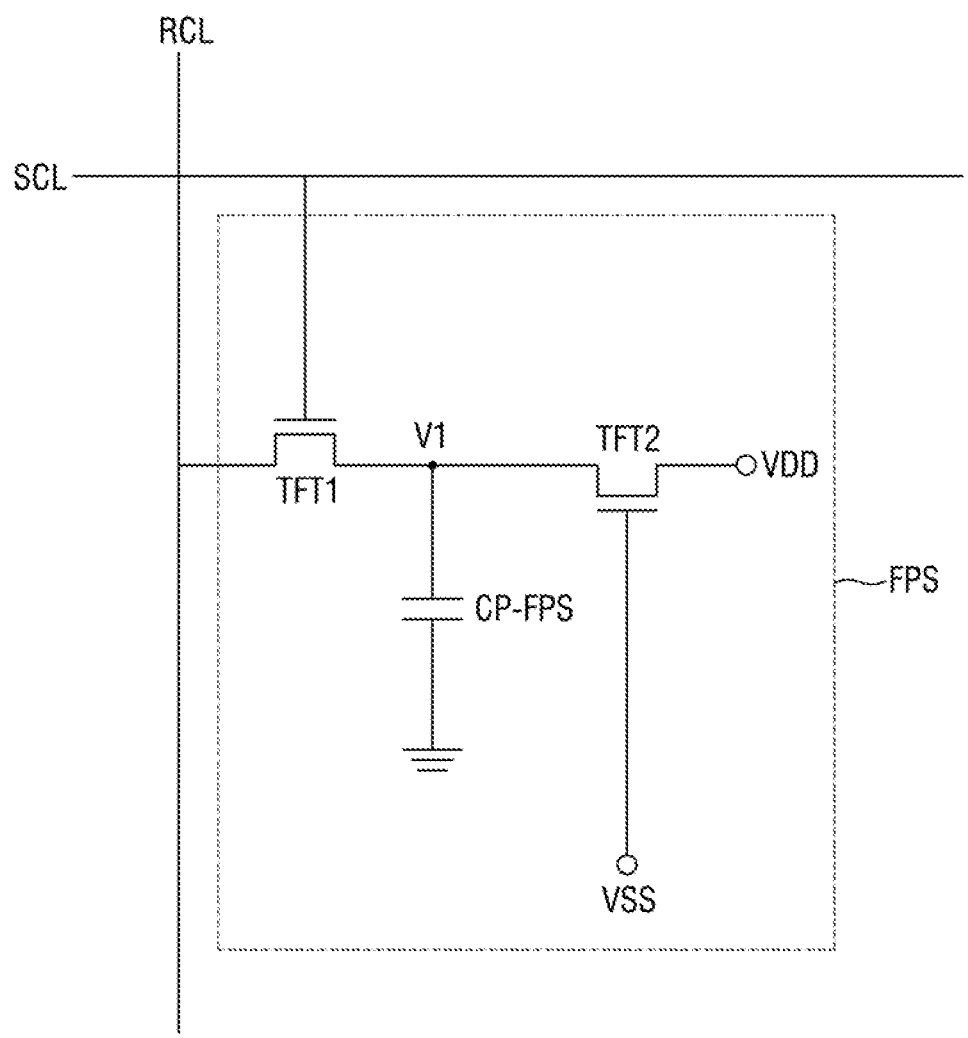
FIG. 11 is an equivalent circuit diagram of a fingerprint recognition sensor according to an exemplary embodiment of the present disclosure.
Figure 12:
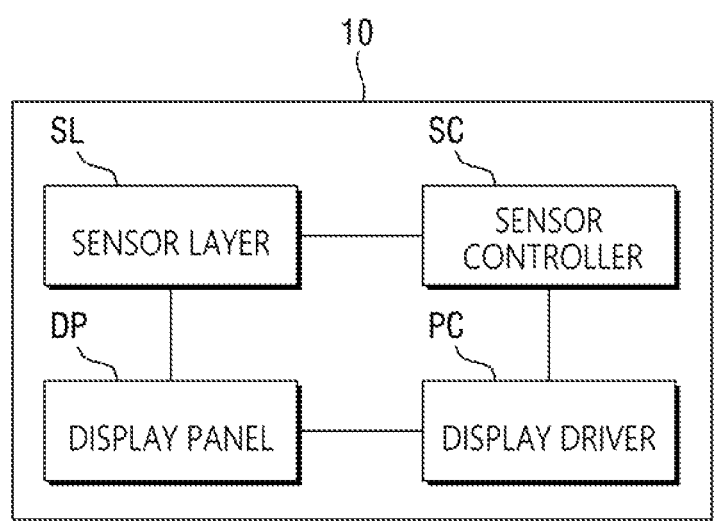
FIG. 12 is a block diagram of a display device according to an exemplary embodiment of the present disclosure.

FIG. 10 is a plan view of a sensor layer according to an exemplary embodiment of the present disclosure, FIG. 11 is an equivalent circuit diagram of a fingerprint recognition sensor according to an exemplary embodiment of the present disclosure, and FIG. 12 is a block diagram of a display device according to an exemplary embodiment of the present disclosure.

Referring to FIG. 10, according to an exemplary embodiment, the sensor layer SL includes a plurality of scan lines SCL, a plurality of read-out lines RCL, and the fingerprint recognition sensors FPS. An area in which the fingerprint recognition sensors FPS are disposed is referred to as the fingerprint recognition area FPA.

According to an exemplary embodiment, the scan lines SCL are connected to their respective fingerprint recognition sensors FPS, and the read-out lines RCL are connected to their respective fingerprint recognition sensors FPS.

According to an exemplary embodiment, a non-fingerprint recognition area NFPA is located on the outside of the fingerprint recognition area FPA. A scan driver circuit SCV to which the scan lines SCL are connected is disposed on one side of the non-fingerprint recognition area NFPA.

According to an exemplary embodiment, a read-out circuit RCV to which the read-out lines RCL are connected is disposed on another side of the non-fingerprint recognition area NFPA, but embodiments of the present disclosure are not limited thereto. In another embodiment, signals may be transmitted from an external integrated circuit to the read-out lines RCL without mediation of the read-out circuit RCV.

According to an exemplary embodiment, the scan lines SCL and the read-out lines RCL include fingerprint recognition sensor pads PD-FPS which are connected to the ends of the scan lines SCL and the read-out lines RCL.

According to an exemplary embodiment, the fingerprint recognition sensor pads PD-FPS so are formed by a same process as that which forms the transistors that drive the fingerprint recognition sensors FPS.

According to an exemplary embodiment, scan signals are sequentially transmitted to the scan lines SCL. The read-out lines RCL receive signals output from the fingerprint recognition sensors FPS and transmit the received signals to the read-out circuit RCV, but embodiments of the the present disclosure are not limited thereto. In another embodiment, the read-out lines RCL transmit the signals output from the fingerprint recognition sensors FPS not to the read-out circuit RCV, but to a circuit that processes the signals received from the fingerprint recognition sensors FPS.

FIG. 11 illustrates an exemplary fingerprint recognition sensor FPS connected to an arbitrary scan line SCL and an arbitrary read-out line RCL, but the structure of the fingerprint recognition sensors FPS is not limited thereto, and can vary in other embodiments.

Referring to FIG. 11, according to an exemplary embodiment, a fingerprint recognition sensor FPS includes a first transistor TFT 1, a second transistor TFT2, and a sensing capacitor CP-FPS.

According to an exemplary embodiment, a control electrode of the first transistor TFT1, which is a switching element, is connected to a scan line SCL, an output electrode of the first transistor TFT1 is connected to a read-out line RCL, and an input electrode of the first transistor TFT1 is connected to the sensing capacitor CP-FPS. An input electrode of the second transistor TFT2 is connected to an input voltage line VDD, an output electrode of the second transistor TFT2 is connected to the sensing capacitor CP-FPS, and a control electrode of the second transistor TFT2 is connected to a common voltage line VSS.

According to an exemplary embodiment, in response to light reflected from an external object being incident to the second transistor TFT2, a current is generated by a semiconductor in a channel portion formed of amorphous silicon or polycrystalline silicon and flows toward the sensing capacitor CP-FPS and the first transistor TFT1 due to a voltage of the input voltage line VDD. That is, the second transistor TFT2 is a phototransistor, which is a type of optical sensor that converts optical energy into electrical energy and uses a photovoltaic effect in which a current varies depending on the intensity of light. The phototransistor amplifies an optical current using a transistor. In response to a selection signal being transmitted to the scan line SCL, a current flows through the read-out line RCL.

Referring to FIG. 12, according to an exemplary embodiment, the display device 10 further includes a sensor controller SC and a display driver PC.

According to an exemplary embodiment, the sensor controller SC controls operations of the sensor layer SL and recognizes a user's fingerprint by detecting variations in the amount of light in the sensor layer SL.

According to an exemplary embodiment, the display driver PC controls the image display operation of a display panel DP by transmitting image driving signals to the display panel DP. Here, the display panel DP includes the substrate SUB, the buffer film BF, thin-film transistor (TFT) layer TFTL, the light-emitting element layer EML, and the thin-film encapsulation layer TFEL. The display driver PC generates the image driving signals using image data and control signals received from an external source. For example, the display driver PC receives the image data and the control signals from an external host, and the control signals include a vertical synchronization signal, a horizontal synchronization signal, and a main clock signal. The image driving signals include a scan signal and a data signal generated using the image data.

According to an exemplary embodiment, the sensor controller SC and the display driver PC can be incorporated into a single element. For example, the sensor controller SC and the display driver PC can be incorporated into a single integrated circuit.

According to an exemplary embodiment, the structure described above with reference to FIGS. 10 through 12 is an exemplary structure that drives the fingerprint recognition sensors FPS, but embodiments of the present disclosure are not limited thereto. Various other types of sensors that can sense infrared light may be used as the fingerprint recognition sensors FPS in other embodiments.

Figure 13:
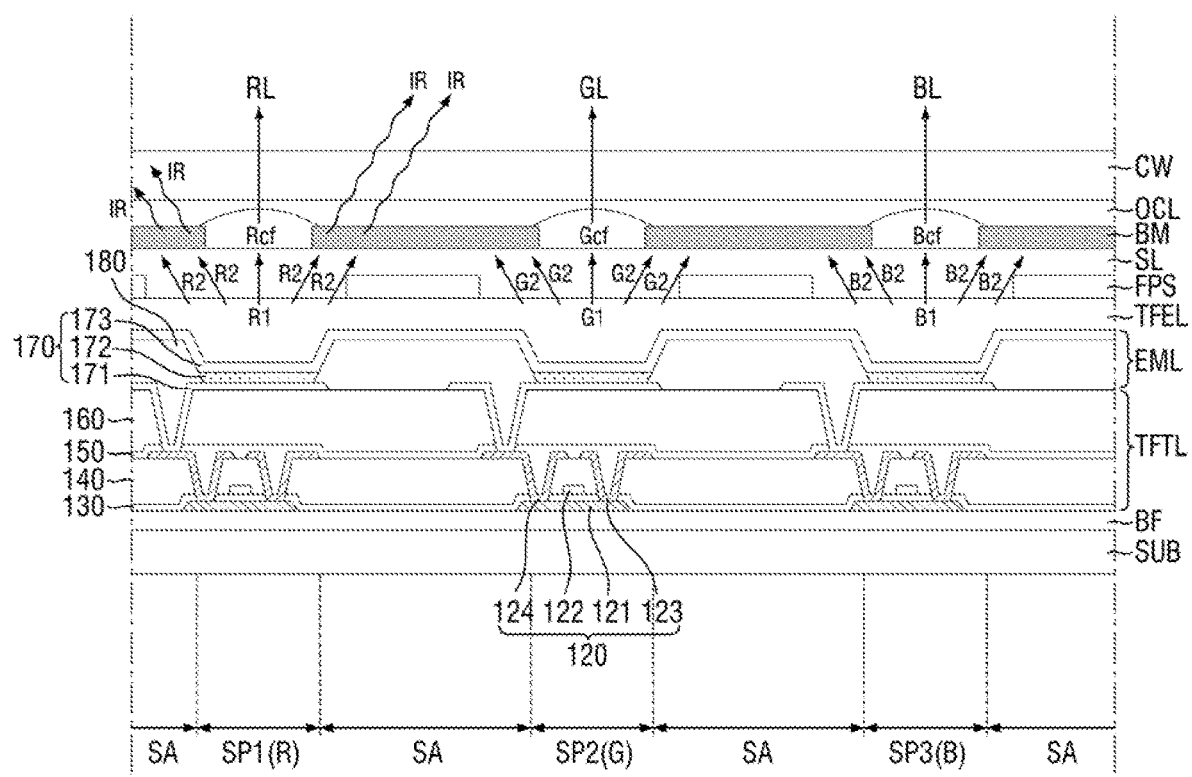
FIG. 13 is a cross-sectional view that illustrates how light is output according to another exemplary embodiment of the present disclosure.
Figure 14:
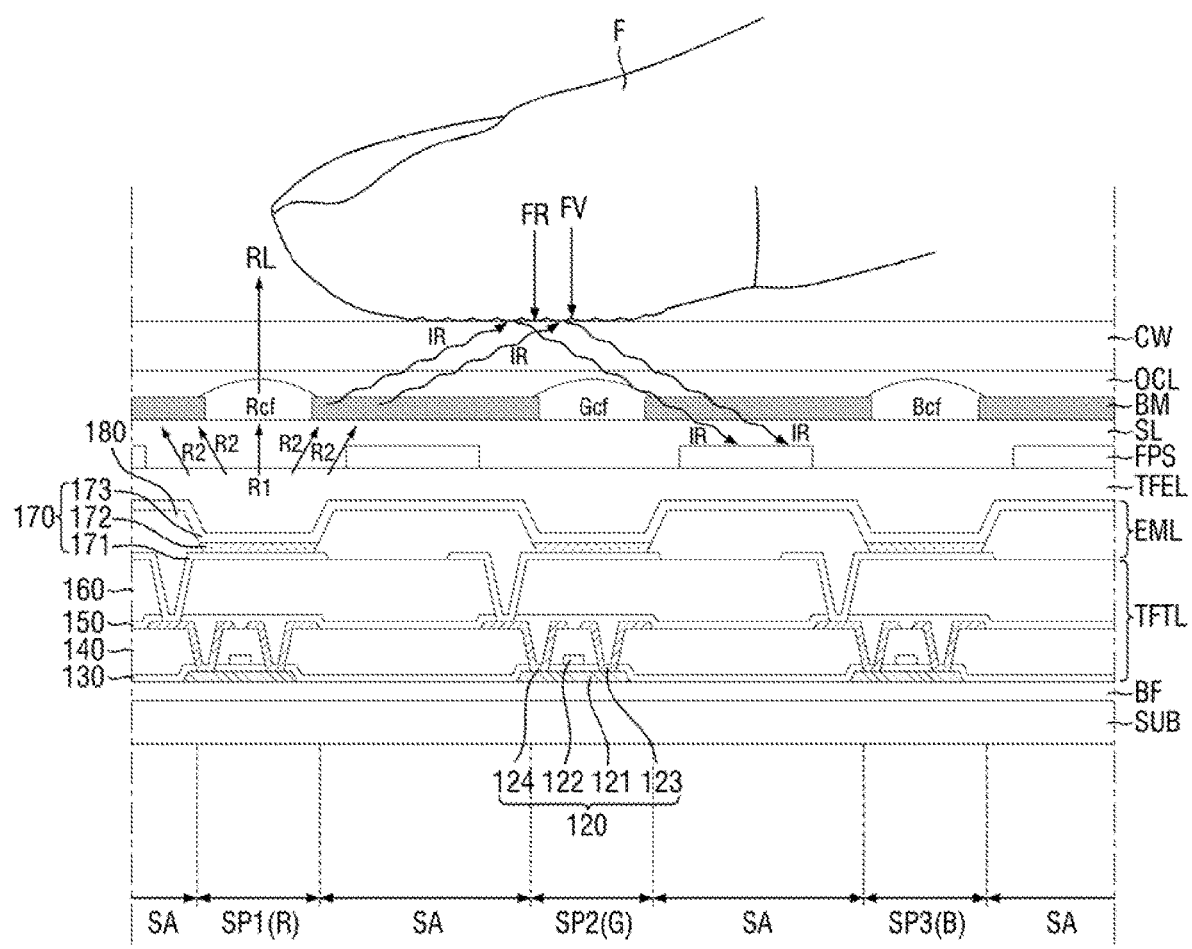
FIG. 14 is a cross-sectional view that illustrates how fingerprint recognition is performed according to another exemplary embodiment of the present disclosure.

FIG. 13 is a cross-sectional view that illustrates how light is output according to another exemplary embodiment of the present disclosure, and FIG. 14 is a cross-sectional view that illustrates how fingerprint recognition is performed according to another exemplary embodiment of the present disclosure. An exemplary embodiment of FIGS. 13 and 14 differs from an exemplary embodiment of FIGS. 5 and 8 in that a color filter is disposed above the subpixels. An exemplary embodiment of FIGS. 13 and 14 will hereinafter be described, focusing mainly on the differences with an exemplary embodiment of FIGS. 5 and 8.

Referring to FIGS. 13 and 14, according to an exemplary embodiment, color filters CF are disposed above subpixels SP1, SP2 and SP3. For example, when the first, second, and third subpixels SP1, SP2 and SP3 are red, green, and blue subpixels R, G and B, respectively, a red color filter Rcf is disposed above the first subpixel SP1, a green color filter Gcf is disposed above the second subpixel SP2, and a blue color filter Bcf is disposed above the third subpixel SP3.

According to an exemplary embodiment, the color filters CF are disposed on the sensor layer SL in the regions between the black matrices BM, and the edges of the color filters CF partially overlap the tops of black matrices BM. An overcoat layer OCL is disposed on the black matrices BM and the color filters CF.

In exemplary embodiment of FIGS. 13 and 14, the color filters CF correspond to the first, second, and third subpixels SP1, SP2, and SP3. Thus, color reproducibility can be improved. In addition, since a polarizing plate can be eliminated, the thickness of the display device 10 can be reduced, and the manufacturing cost of a display device 10 can be reduced.

Figure 15:
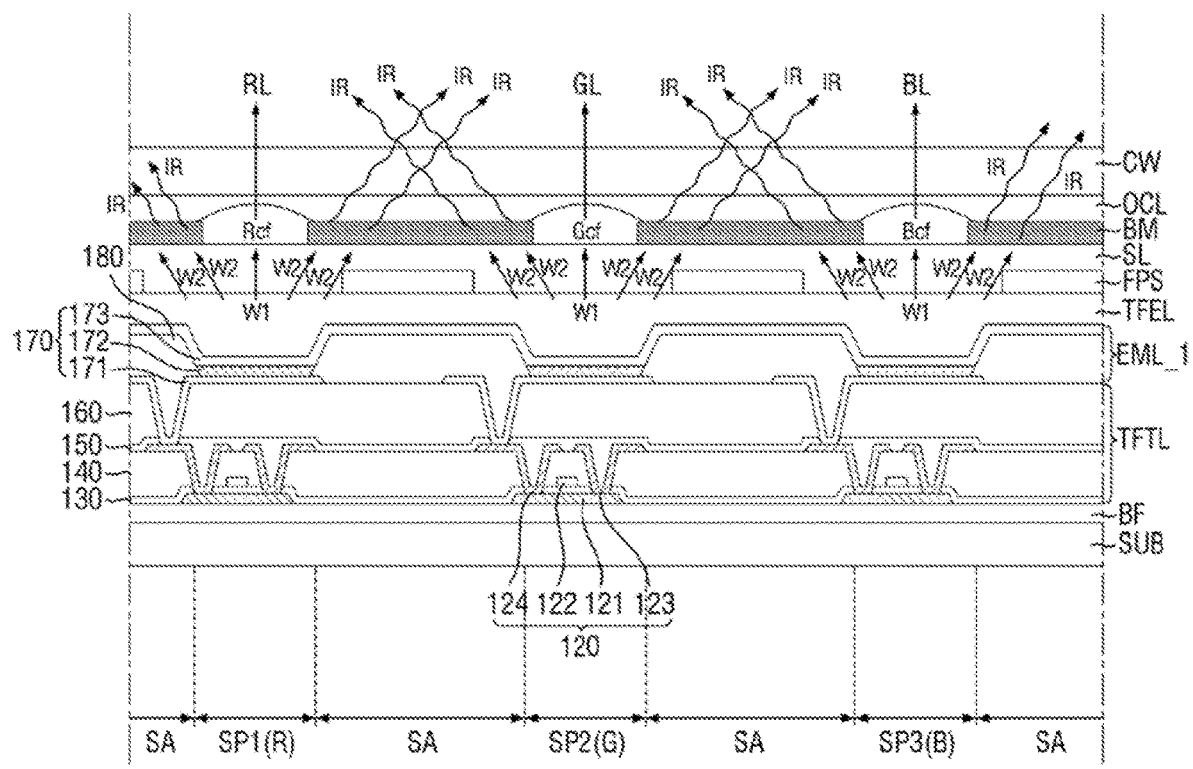
FIG. 15 is a cross-sectional view that illustrates how light is output according to another exemplary embodiment of the present disclosure.
Figure 16:
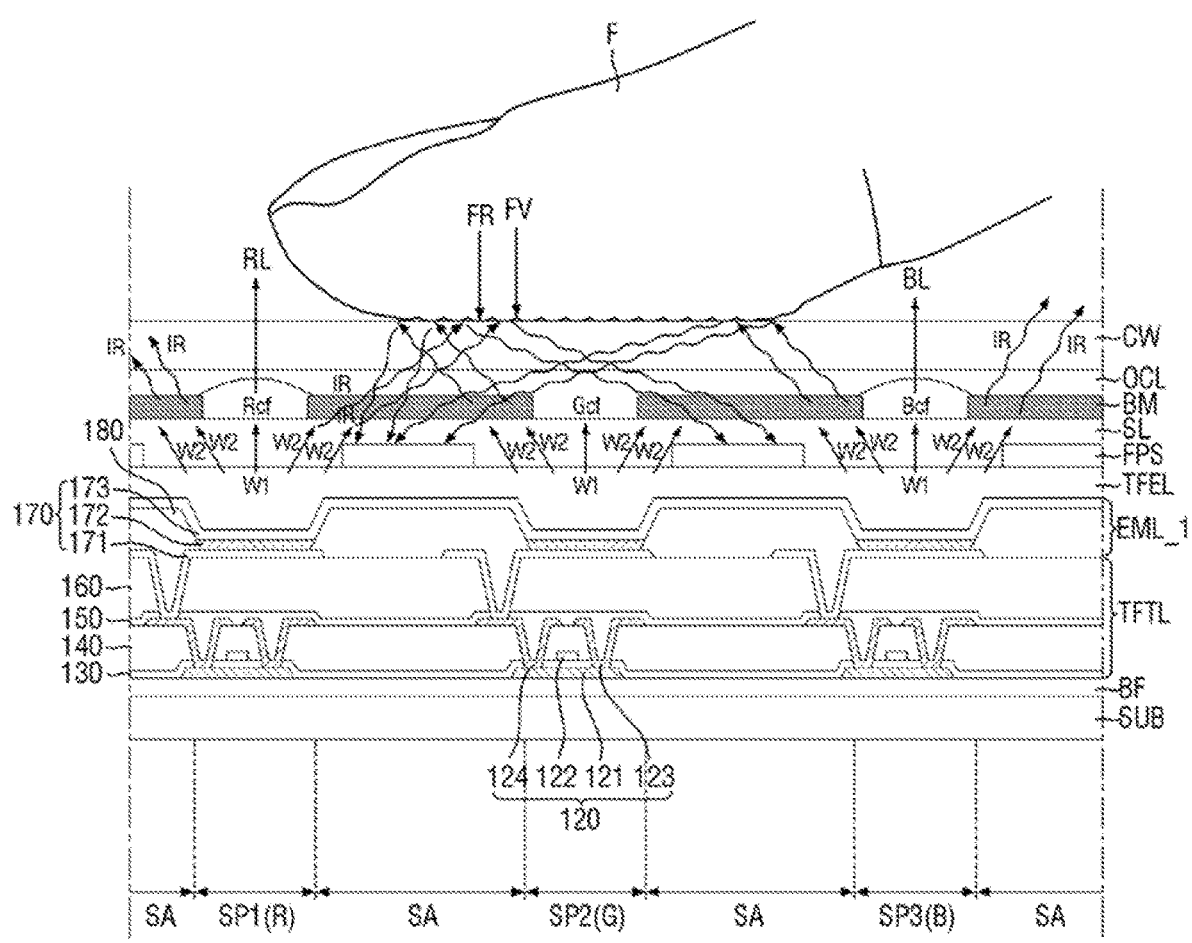
FIG. 16 is a cross-sectional view that illustrates how fingerprint recognition is performed according to another exemplary embodiment of the present disclosure.

FIG. 15 is a cross-sectional view that illustrates how light is output according to another exemplary embodiment of the present disclosure, and FIG. 16 is a cross-sectional view that illustrates how fingerprint recognition is performed according to another exemplary embodiment of the present disclosure. An exemplary embodiment of FIGS. 15 and 16 differs from an exemplary embodiment of FIGS. 13 and 14 in that a light-emitting element layer in which a plurality of subpixels are disposed emits white light. An exemplary embodiment of FIGS. 15 and 16 will hereinafter be described, focusing mainly on differences with an exemplary embodiment of FIGS. 13 and 14.

Referring to FIGS. 15 and 16, according to an exemplary embodiment, a light-emitting element layer EML_1 emits white light W. Specifically, the organic light-emitting element layers 172, which correspond to the first, second and third subpixels SP1, SP2 and SP3 emit white light W.

According to an exemplary embodiment, each of the organic light-emitting element layers 172 is formed by stacking multiple light-emitting layers that emit light of different colors and thus emit white light W by combining the different colored light emitted by the multiple light-emitting layers.

According to an exemplary embodiment, the organic light-emitting layers 172 are illustrated as corresponding to the first, second and third subpixels SP1, SP2 and SP3, but embodiments of the present disclosure are not limited thereto. In another embodiment, the organic light-emitting layers 172 are formed on the entire surface of a substrate SUB to cover first electrodes 171 and pixel defining films 180.

According to an exemplary embodiment, white light W1 and W2 emitted by the organic light-emitting layer 172 disposed in the first subpixel SP1 includes first white light W1 output to regions between the black matrices BM and second white light W2 output to the black matrices BM. The first white light W1 is output as red light RL through a red color filter Rcf, and the second white light W2 is incident upon the black matrices BM and is converted into, and output as, infrared light IR through the overcoat layer OCL and cover window CW.

According to an exemplary embodiment, white light W1 and W2 emitted by the organic light-emitting layer 172 disposed in the second subpixel SP2 includes first white light W1 output to regions between the black matrices BM and second white light W2 output to the black matrices BM. The first white light W1 is output as green light GL through a green color filter Gcf, and the second white light W2 is incident upon the black matrices BM and is converted into, and output as, infrared light IR through the overcoat layer OCL and the cover window CW.

According to an exemplary embodiment, white light W1 and W2 emitted by the organic light-emitting layer 172 disposed in the third subpixel SP3 includes first white light W1 output to regions between the black matrices BM and second white light W2 output to the black matrices BM. The first white light W1 is output as blue light BL through a blue color filter Bcf, and the second white light W2 is incident upon the black matrices BM and is converted into, and output as, infrared light IR through the overcoat layer OCL and the cover window CW.

According to an exemplary embodiment, when the organic light-emitting layers 172 all emit white light W, infrared light IR is output from black matrices BM adjacent to the first, second, and third subpixels SP1, SP2, and SP3 and is reflected from ridges FR or valleys FV of a user's finger F. Accordingly, the amount of infrared light IR received by fingerprint recognition sensors FPS increases, and as a result, a fingerprint pattern can be precisely recognized.

Figure 17:
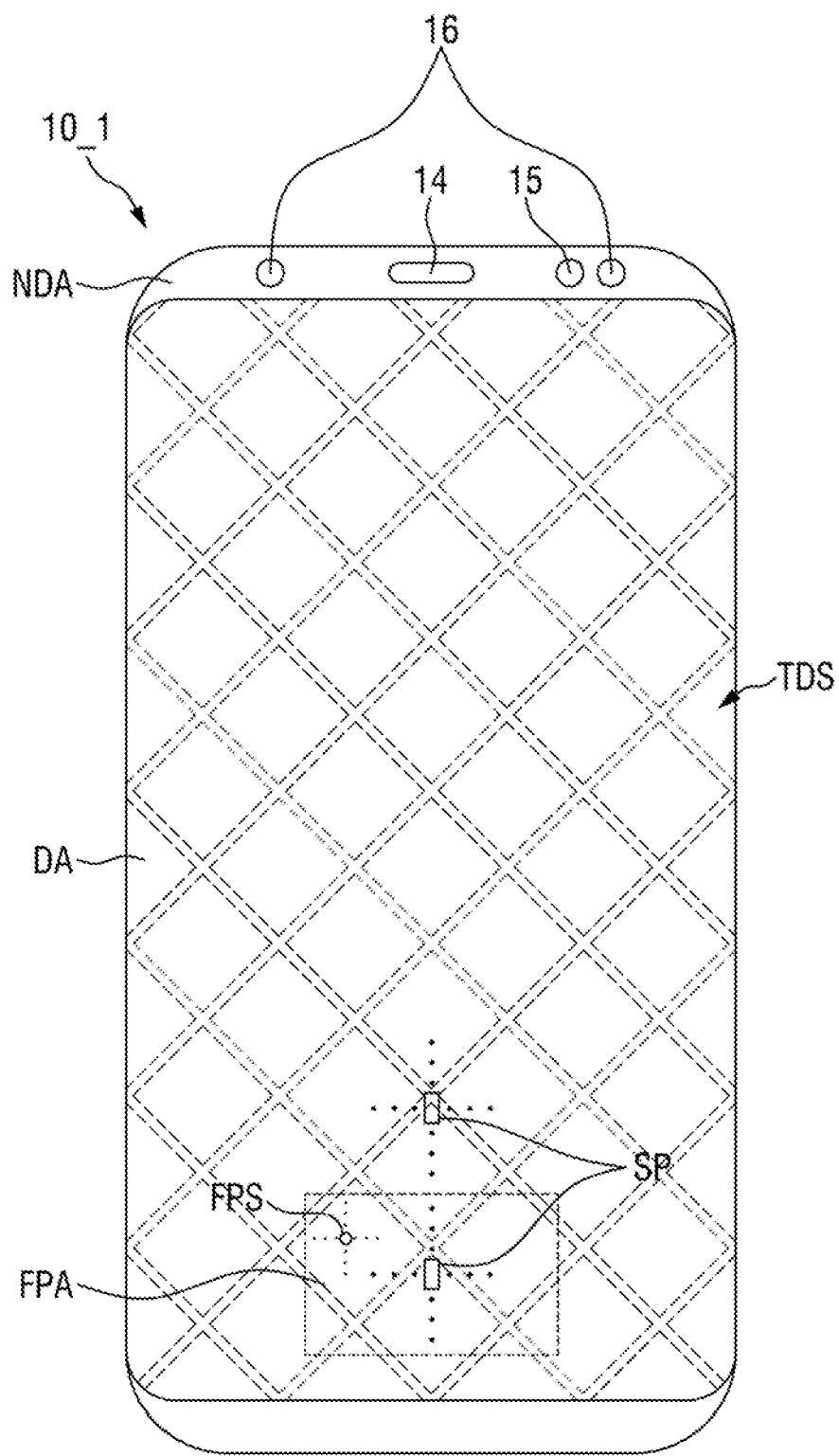
FIG. 17 is a plan view of a display device according to another exemplary embodiment so of the present disclosure.
Figure 18:
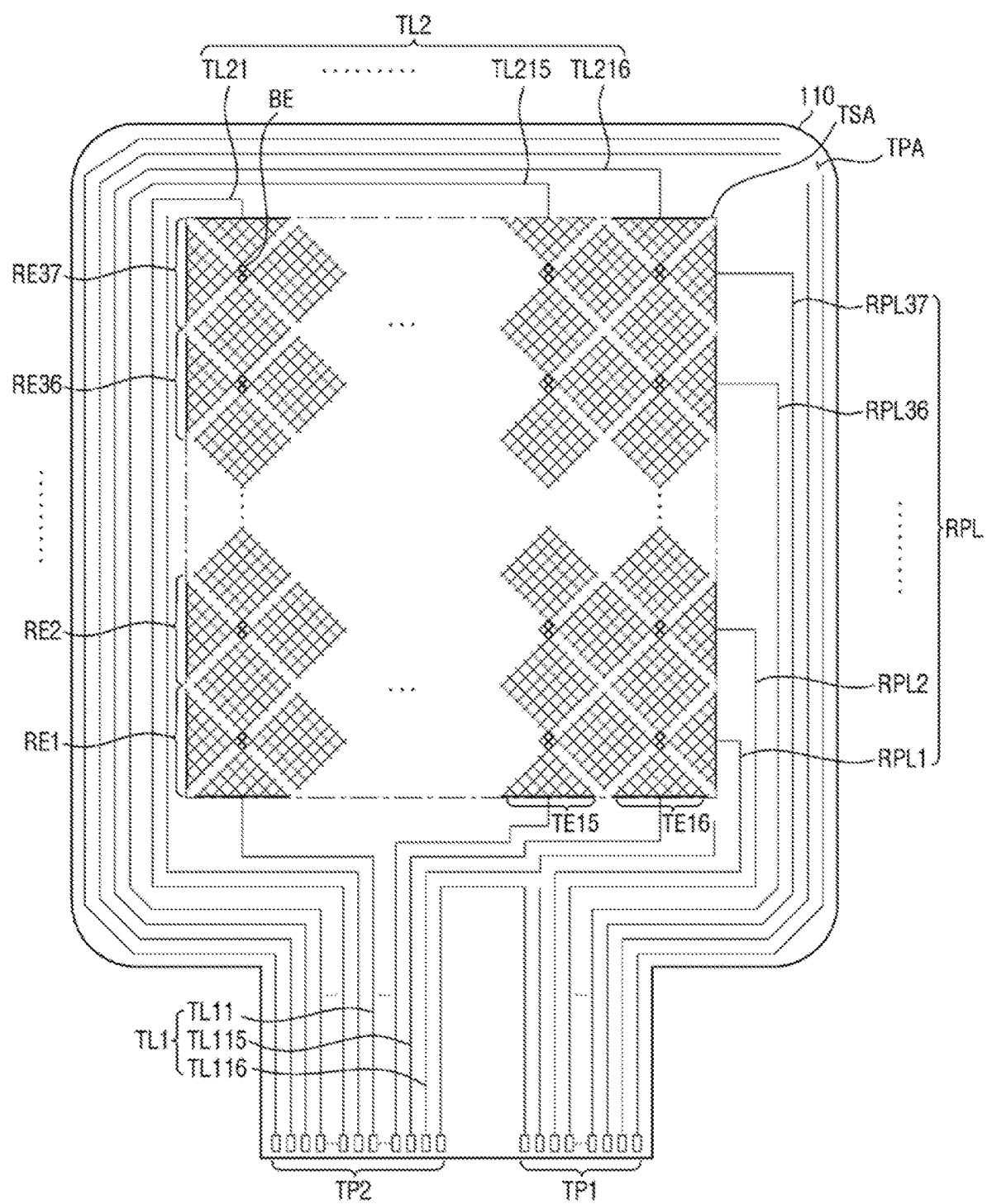
FIG. 18 is a plan view of a touch sensor of the display device according to another exemplary embodiment of the present disclosure.

FIG. 17 is a plan view of a display device according to another exemplary embodiment of the present disclosure, and FIG. 18 is a plan view of a touch sensor of a display device according to another exemplary embodiment of the present disclosure.

Referring to FIG. 17, according to an exemplary embodiment, in a display device 10_1, touch detection sensors TDS are disposed in an entire display area DA, including a fingerprint recognition area FPA. The touch detection sensors TDS are a capacitive type and include touch electrodes TE and RE that detect a user's touch input and touch lines (TL and RPL) that connect pads and the touch electrodes. For example, the touch detection sensors TDS may detect a user's touch input in a self-capacitance manner or in a mutual capacitance manner.

Referring to FIG. 18, according to an exemplary embodiment, the display device 10_1 includes a touch sensing area TSA for detecting a user's touch input and a touch peripheral area TPA disposed on the periphery of the touch sensing area TSA. The touch sensing area TSA overlaps the display area DA, and the touch peripheral area TPA overlaps a non-display area NDA.

According to an exemplary embodiment, the touch electrodes TE and RE are disposed in the touch sensing area TSA. The touch electrodes TE and RE include sensing electrodes RE that are electrically connected in a first (X) direction and driving electrodes TE that are electrically connected in a second (Y) direction that intersects the first (X) direction. FIG. 18 illustrates an embodiment in which the sensing electrodes RE and the driving electrodes TE have a rhombic shape in a plan view, but embodiments of the present disclosure are not limited thereto.

According to an exemplary embodiment, to prevent the sensing electrodes RE and the driving electrodes TE from being short-circuited at their intersections, pairs of adjacent driving electrodes TE in the second (Y) direction are electrically connected via connecting electrodes. In this case, the driving electrodes TE and the sensing electrodes RE are disposed in the same layer, and the connecting electrodes are disposed in a different layer from the driving electrodes TE and the sensing electrodes RE. The sensing electrodes RE are electrically insulated from the driving electrodes TE.

According to an exemplary embodiment, the touch lines TL and RPL are disposed in the touch peripheral area TPA. The touch lines TL and RPL include sensing lines RPL connected to the sensing electrodes RE and first driving lines TL1 and second driving lines TL2 connected to the driving electrodes TE.

According to an exemplary embodiment, the sensing electrodes RE are connected to the sensing lines RPL. The sensing lines RPL are connected to first touch pads TP1. First ends of the driving electrodes TE are connected to the first driving lines TL1, and second ends of the driving electrodes TE are connected to the second driving lines TL2. For example, the first driving lines TL1 are connected to the driving electrodes TE at the lower side of the touch sensing area TSA, and the second driving lines TL2 are connected to the driving electrodes TE at the upper side of the touch sensing area TSA. In this example, the second driving lines TL2 are connected to the driving electrodes TE on the upper side of the touch sensing area TSA at the outer right side of the touch sensing area TSA. The first driving lines TL1 and the second driving lines TL2 are connected to second driving pads TP2. Accordingly, a touch driving circuit is electrically connected to the driving electrodes TE and the sensing electrodes RE.

According to an exemplary embodiment, the touch electrodes TE and RE may be driven in the mutual capacitance manner or in the self-capacitance manner. When the touch electrodes TE and RE are driven in a mutual capacitance manner, driving signals are transmitted to the driving electrodes TE via the first driving lines TL1 and the second driving lines TL2 so that mutual capacitances at the intersections of the sensing electrodes RE and the driving electrodes TE are charged. Then, charge variations in the sensing electrodes RE are measured via the sensing lines RPL, and the presence of a touch input is determined based on the measured charge variations. The driving signals have multiple driving pulses.

According to an exemplary embodiment, when the touch electrodes TE and RE are driven in a self-capacitance manner, driving signals are transmitted to both the driving electrodes TE and the sensing electrodes RE via the first driving lines TL1, the second driving lines TL2, and the sensing lines RPL so that the self-capacitances of the driving electrodes TE and the sensing electrodes RE are charged. Then, charge variations in the driving electrodes TE and the sensing electrodes RE are measured via the first driving lines TL1, the second driving lines TL2, and the sensing lines RPL, and the presence of a touch input is determined based on the measured charge variations.

Figure 20:
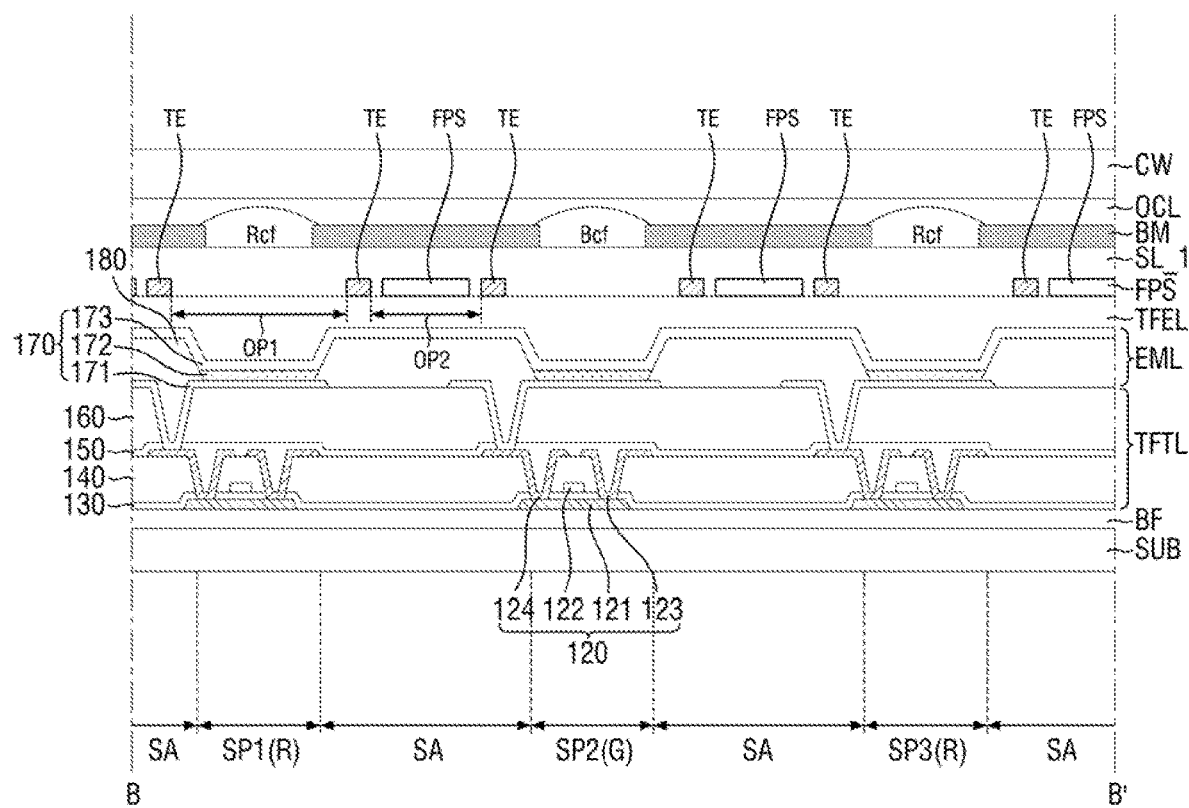
FIG. 20 is a cross-sectional view taken along line B-B' of FIG. 19.

According to an exemplary embodiment, the driving electrodes TE and the sensing electrodes RE are formed as mesh-type electrodes. When a sensor layer SL_1 that includes the driving electrodes TE and the sensing electrodes RE is formed directly on a thin-film encapsulation layer TFEL, as illustrated in FIG. 20, very large parasitic capacitances can be generated between a second electrode 173 of a light-emitting element layer EML and the driving electrodes TE or the sensing electrodes RE of the sensor layer SL_1 because the second electrode 173 is very close to the driving electrodes TE and the sensing electrodes RE of the sensor layer SL_1. To lower such parasitic capacitances, the driving electrodes TE and the sensing electrodes RE are formed as mesh-type electrodes, rather than being formed as non-patterned electrodes of a transparent oxide conductive layer such as ITO or IZO, but embodiments of the present disclosure are not limited thereto.

Figure 19:
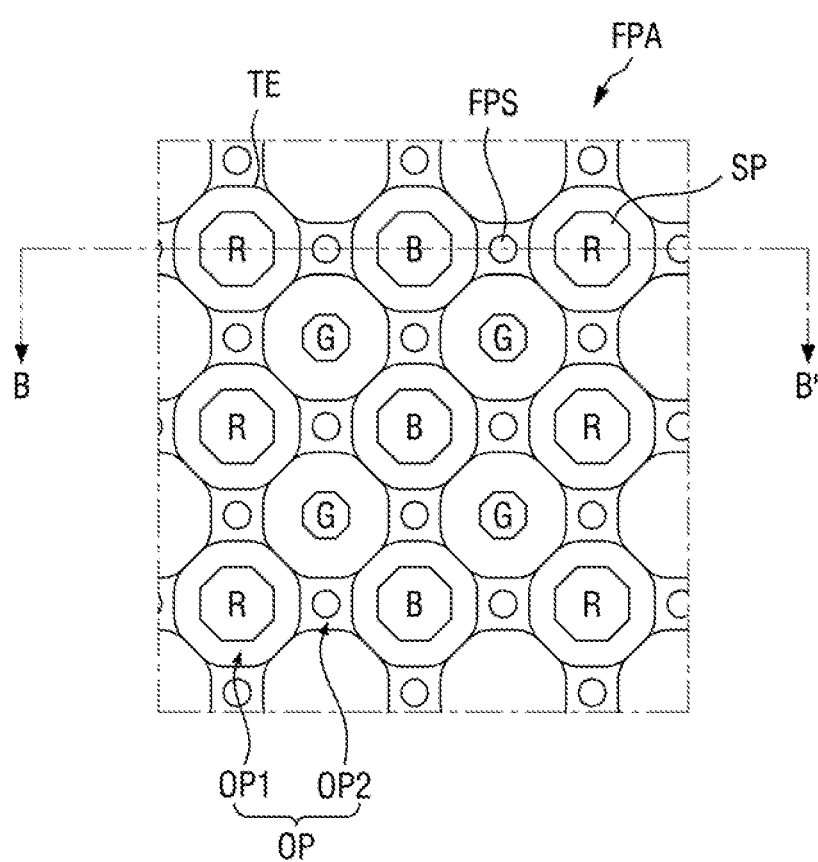
FIG. 19 is a plan view of a part of a fingerprint recognition area according to another exemplary embodiment of the present disclosure.

FIG. 19 is a plan view of a part of a fingerprint recognition area according to another exemplary embodiment of the present disclosure, and FIG. 20 is a cross-sectional view taken along line B-B' of FIG. 19. For convenience of description, FIGS. 19 and 20 illustrate a region where driving electrodes TE of touch detection sensors TDS are disposed, and the following description thereof refers to a region where sensing electrodes RE are disposed.

Referring to FIG. 19, according to an exemplary embodiment, in a fingerprint recognition area FPA, a plurality of subpixels SP, driving electrodes TE of touch detection sensors TDS, and fingerprint recognition sensors FPS are disposed.

According to an exemplary embodiment, the driving electrodes TE are mesh-type so electrodes and include a plurality of openings OP, and the subpixels SP and the fingerprint recognition sensors FPS are disposed to correspond to the openings OP. The openings OP of the driving electrodes TE include first openings OP1 and second openings OP2. The subpixels SP are disposed in the first openings OP1, and the fingerprint recognition sensors FPS are disposed in the second openings OP2. The first openings OP1 and the second openings OP2 are alternately arranged, but embodiments of the present disclosure are not limited thereto. The first openings OP1 may have the same size as, or different sizes from, the second openings OP2. That is, the sizes of the first openings OP1 and the second openings OP2 may vary depending on the sizes of, and the pitches between, the subpixels SP and the fingerprint recognition sensors FPS.

Referring to FIG. 20, according to an exemplary embodiment, a sensor layer SL_1 is disposed on a thin-film encapsulation layer TFEL and includes touch detection sensors TDS and fingerprint recognition sensors FPS. Specifically, in the sensor layer SL_1, driving electrodes TE of the touch detection sensors TDS are disposed in the sensor layer SL_1 that are spaced apart from one another, and the fingerprint recognition sensors FPS are disposed between the driving electrodes TE. In addition, not only the driving electrodes TE, but also the sensing electrodes RE, the first driving lines TL1, the second driving lines TL2, and the sensing lines RPL are disposed on the thin-film encapsulation layer TFEL. That is, the driving electrodes TE, the sensing electrodes RE, the first driving lines TL1, the second driving lines TL2, and the sensing lines RPL are disposed in the same layer and formed of the same material.

According to an exemplary embodiment, the first openings OP1 of the driving electrodes TE correspond to the subpixels SP, the second openings OP2 of the driving electrodes TE correspond to peripheral areas SA, and the fingerprint recognition sensors FPS are disposed between the second openings OP2. The driving electrodes TE and the fingerprint recognition sensors FPS are disposed in the same layer due to the second openings OP2 of the driving to electrodes TE. However, embodiments of the present disclosure are not limited to this. In another embodiment, the second openings OP2 of the driving electrodes TE are omitted. For example, the driving electrodes TE are formed into a shape having rhombic first openings OP1, in which case, the driving electrodes TE and the fingerprint recognition sensors FPS are disposed in different layers.

In a cross-sectional view, according to an exemplary embodiment, the driving electrodes TE are spaced apart from one another by the first openings OP1 and the second openings OP2, and the driving electrodes TE and the fingerprint recognition sensors FPS correspond to the peripheral areas SA. Accordingly, in the peripheral areas SA, the pixel defining films 180, the driving electrodes TE, the fingerprint recognition sensors FPS, and black matrices BM are sequentially disposed.

Figure 21:
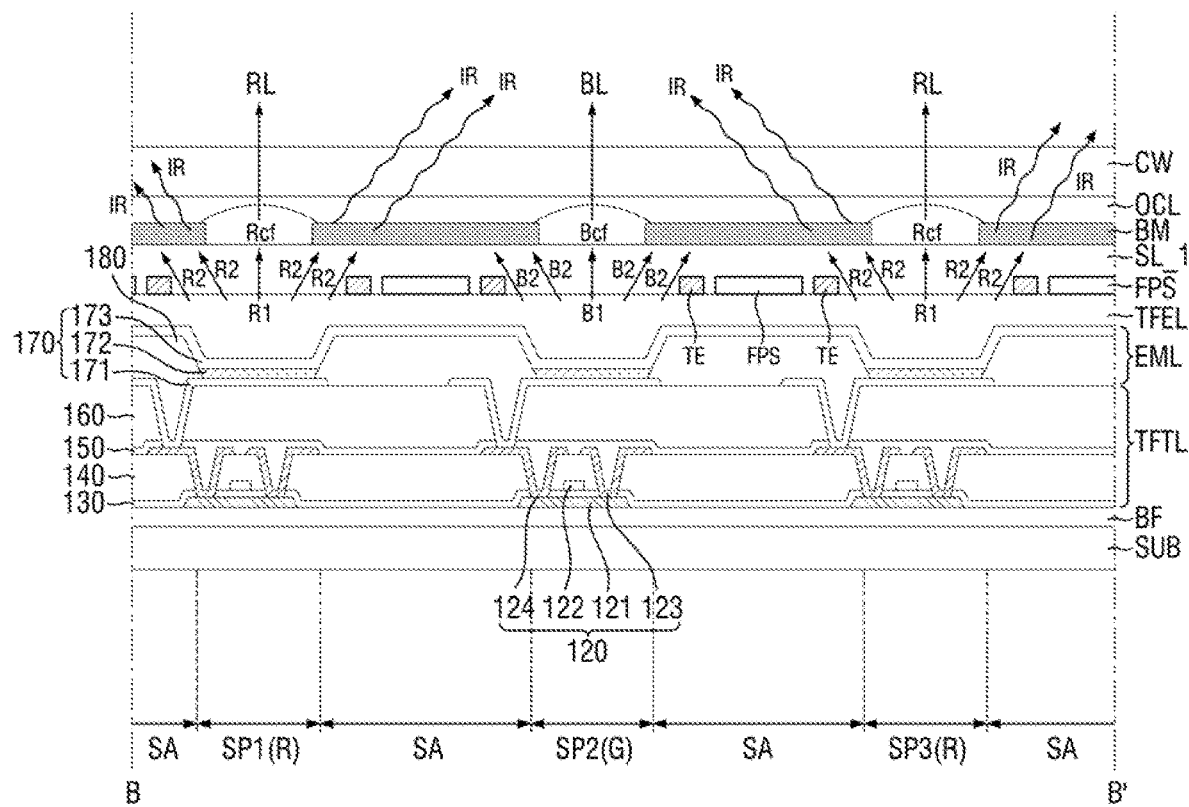
FIG. 21 is a cross-sectional view that illustrates how light is output according to another exemplary embodiment of the present disclosure.
Figure 22:
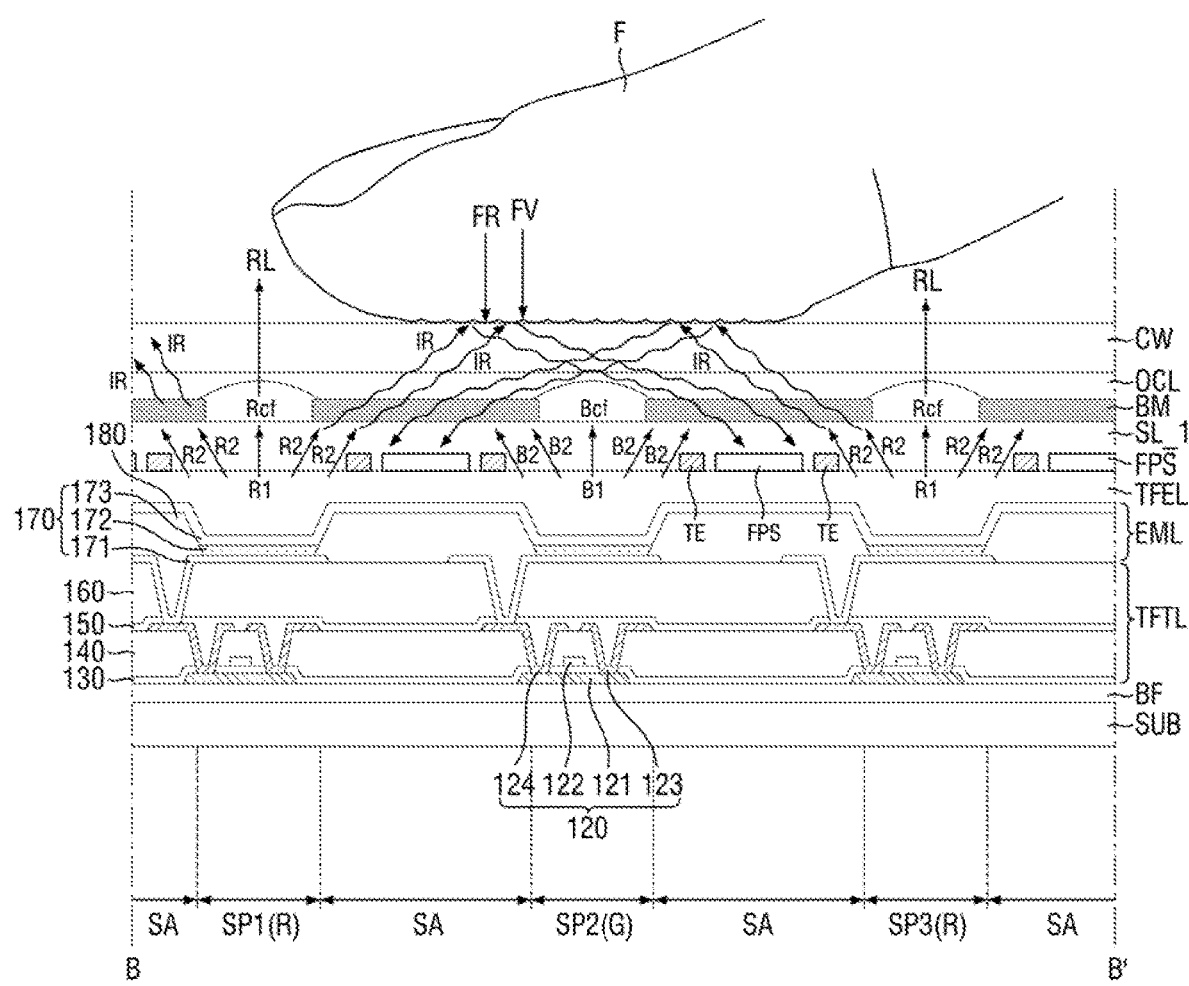
FIG. 22 is a cross-sectional view that illustrates how fingerprint recognition is performed according to another exemplary embodiment of the present disclosure.

FIG. 21 is a cross-sectional view that illustrates how light is output according to another exemplary embodiment of the present disclosure, and FIG. 22 is a cross-sectional view that illustrates how fingerprint recognition is performed according to another exemplary embodiment of the present disclosure. An exemplary embodiment of FIGS. 21 and 22 differs from an exemplary embodiment of FIGS. 13 and 14 in that touch detection sensors are further included in a sensor layer. An exemplary embodiment of FIGS. 21 and 22 will hereinafter be described, focusing mainly on differences with an exemplary embodiment of FIGS. 13 and 14.

Referring to FIGS. 21 and 22, according to an exemplary embodiment, a display device detects touch input from a user based on capacitance variations, and detects a user's fingerprint via infrared light IR. Touch detection sensors TDS and fingerprint recognition sensors FPS can operate independently, but the touch detection sensors TDS can be used to recognize a fingerprint. For example, the contact with a user's finger F or the area of the contact with the finger F can be detected based on touch signals from the touch detection sensors TDS, and a fingerprint recognition mode is activated.

In another embodiment, a fingerprint recognition area FPA is a region where a touch signal is generated, and subpixels SP in the fingerprint recognition area FPA are driven in a fingerprint recognition mode. For example, when the fingerprint recognition sensors FPS are disposed in an entire display area DA, a predetermined region where the touch signal is generated can be determined in real time as the fingerprint recognition area FPA.

In another embodiment, the subpixels SP in the region where the touch signal is generated are driven to emit light, thereby displaying the fingerprint recognition area FPA.

In this manner, according to an exemplary embodiment, since the touch detection sensors TDS can be used in fingerprint recognition, a display device of FIGS. 21 and 22 can provide a further variety of functions.

Figure 23:
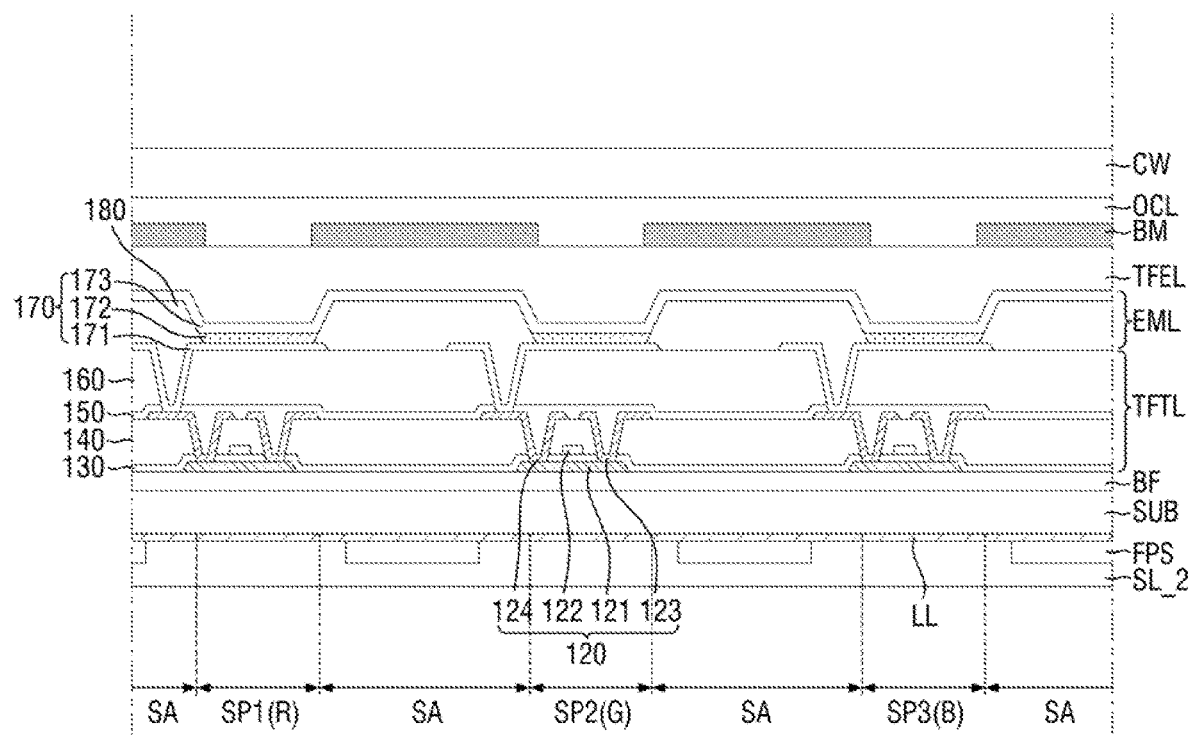
FIG. 23 is a cross-sectional view of a fingerprint recognition area according to another exemplary embodiment of the present disclosure.
Figure 24:
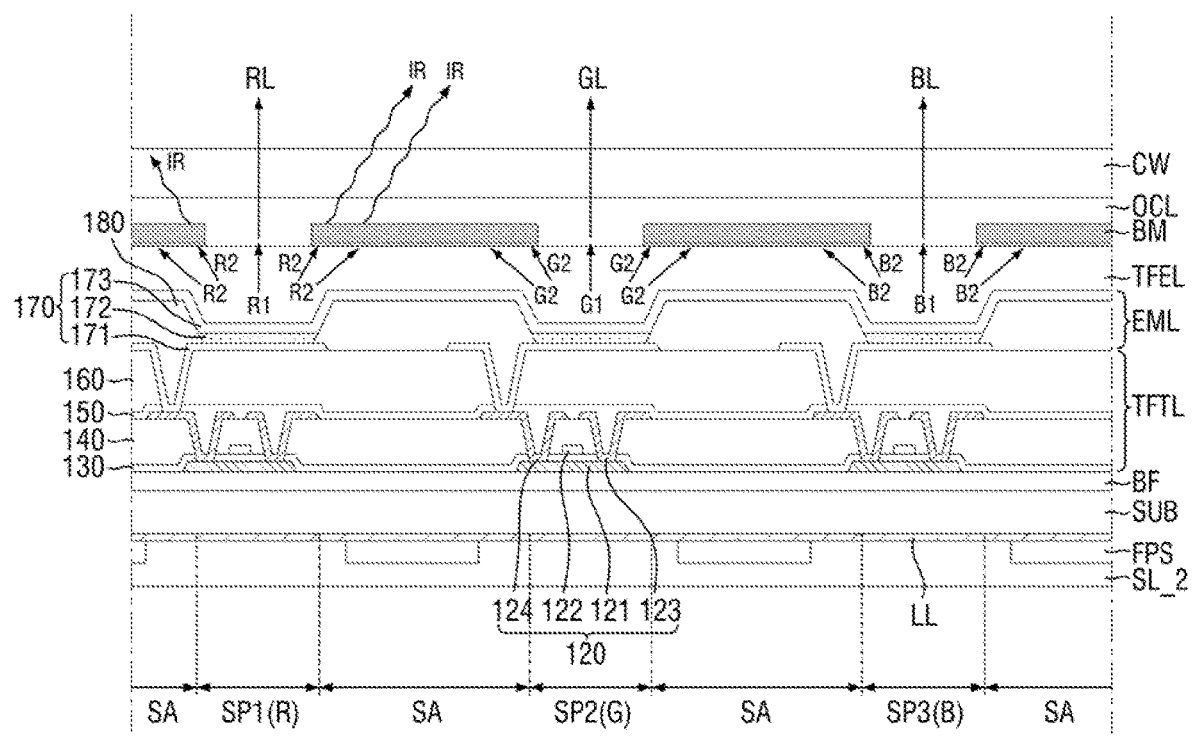
FIG. 24 is a cross-sectional view that illustrates how light is output according to another exemplary embodiment of the present disclosure.
Figure 25:
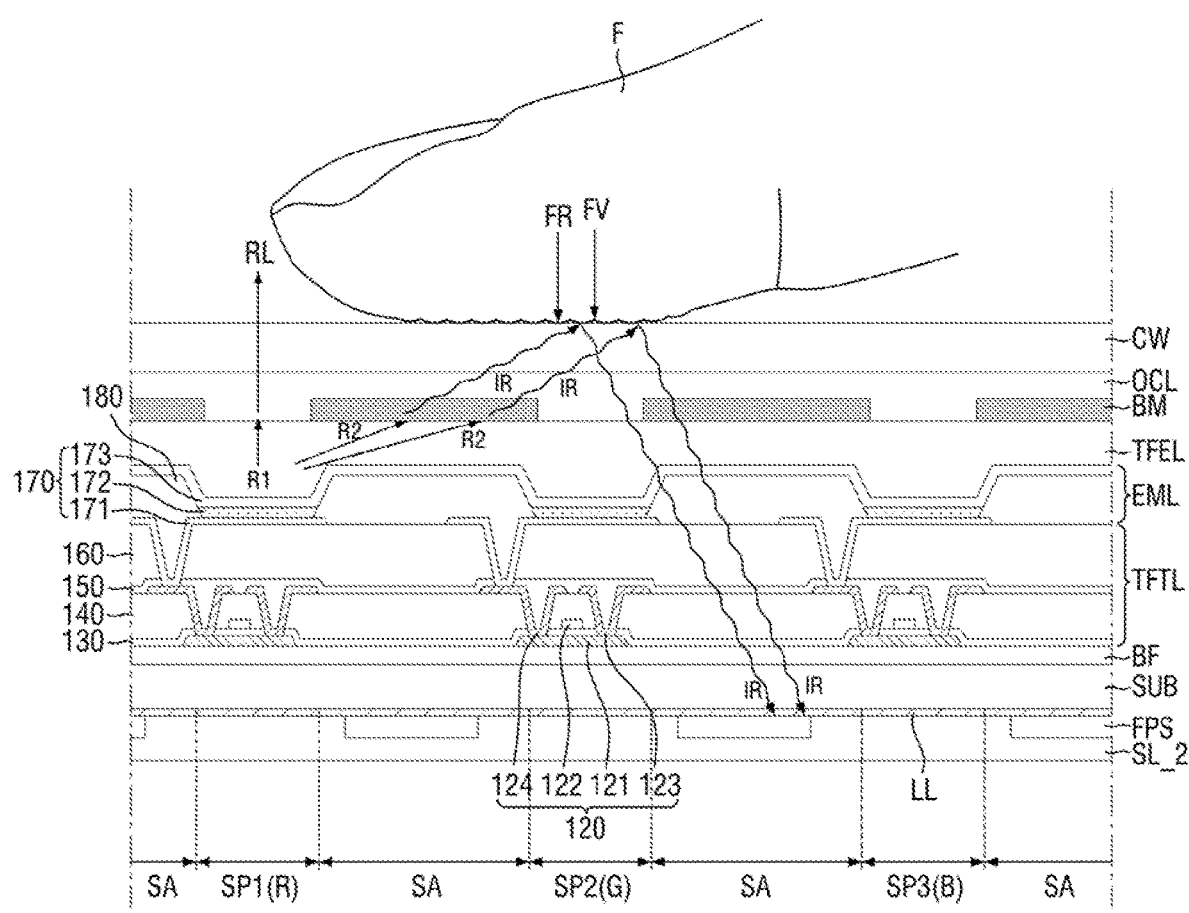
FIG. 25 is a cross-sectional view that illustrates how fingerprint recognition is performed according to another exemplary embodiment of the present disclosure.
Figure 26:
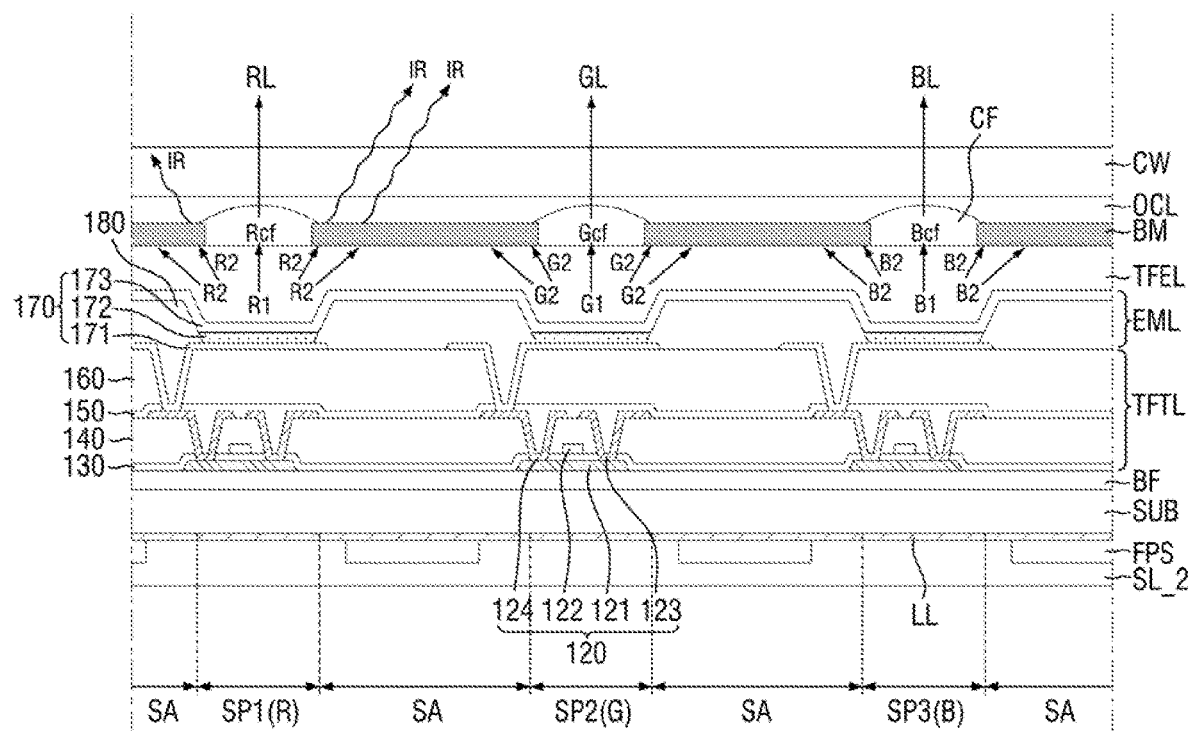
FIG. 26 is a cross-sectional view that illustrates how light is output according to another exemplary embodiment of the present disclosure.
Figure 27:
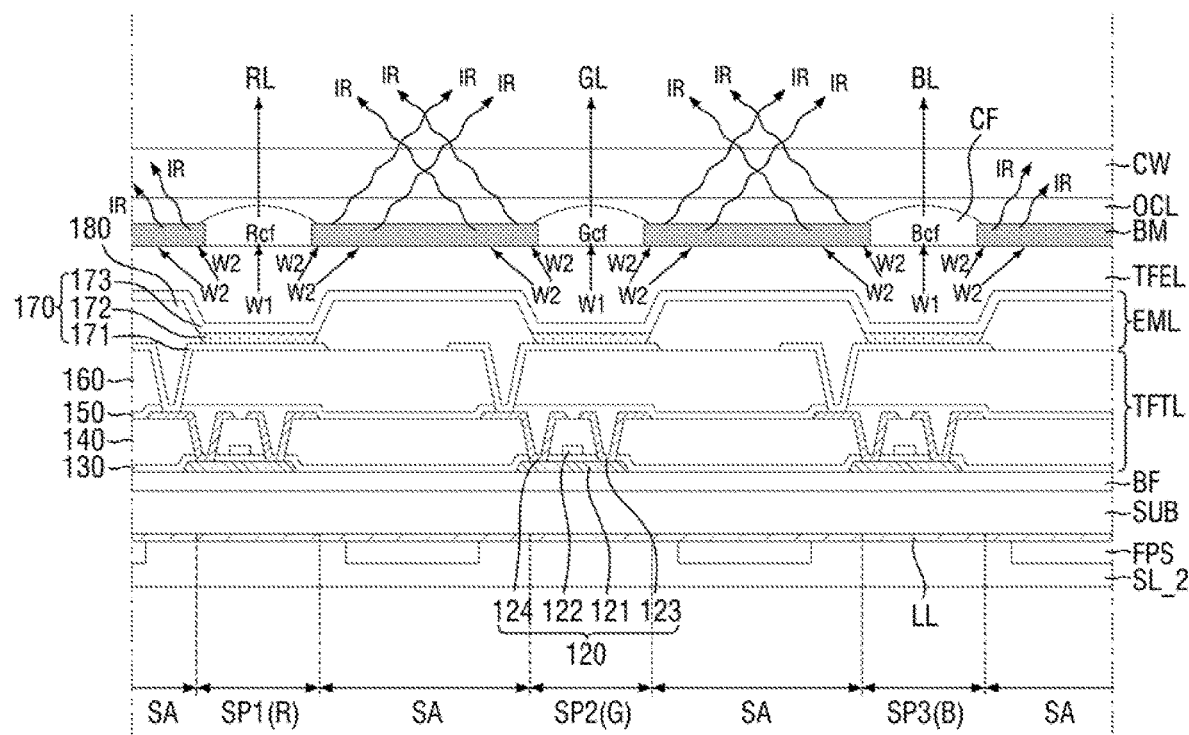
FIG. 27 is a cross-sectional view that illustrates how light is output according to another exemplary embodiment of the present disclosure.
Figure 28:
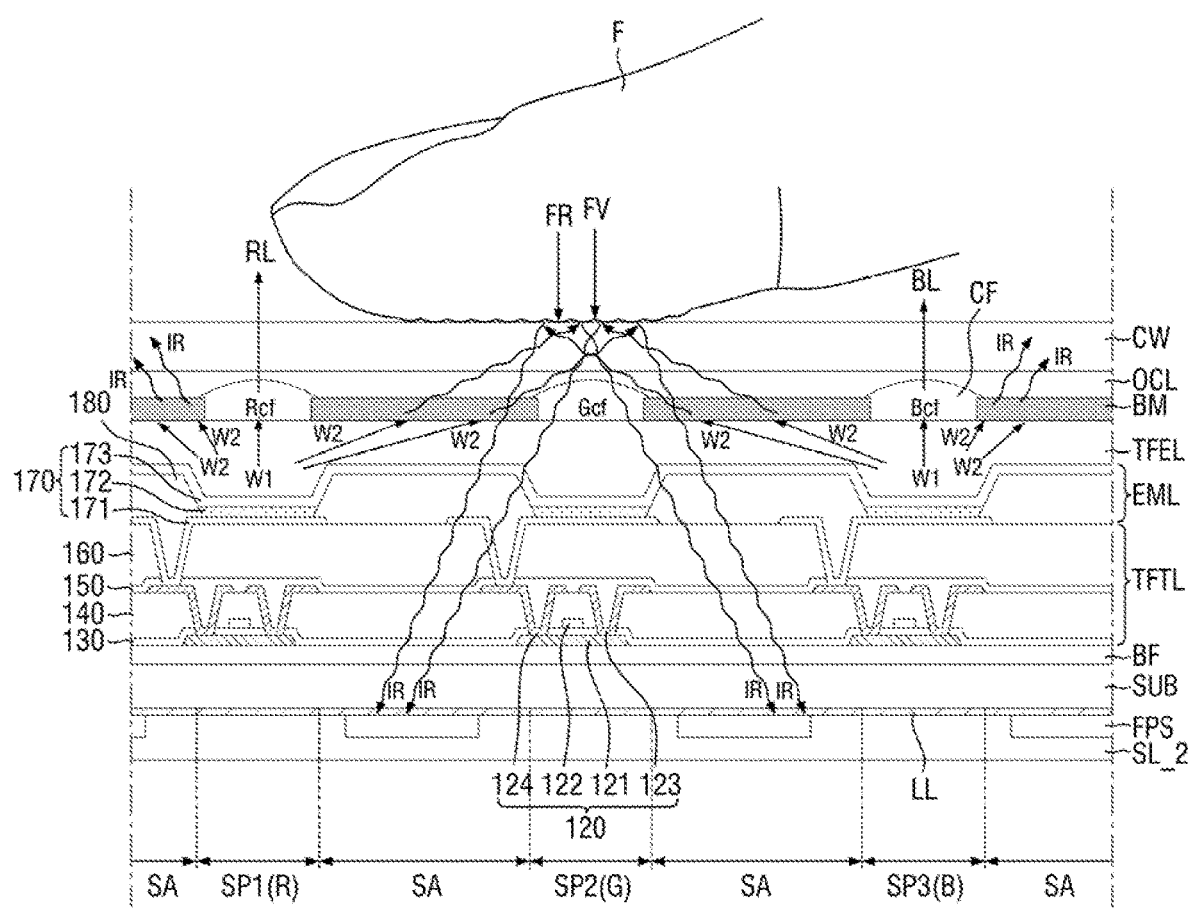
FIG. 28 is a cross-sectional view that illustrates how fingerprint recognition is performed according to another exemplary embodiment of the present disclosure.

FIG. 23 is a cross-sectional view of a fingerprint recognition area according to another exemplary embodiment of the present disclosure, FIG. 24 is a cross-sectional view that illustrates how light is output according to another exemplary embodiment of the present disclosure, FIG. 25 is a cross-sectional view that illustrates how fingerprint recognition is performed according to another exemplary embodiment of the present disclosure, FIG. 26 is a cross-sectional view that illustrates how light is output according to another exemplary embodiment of the present disclosure, FIG. 27 is a cross-sectional view that illustrates how light is output according to another exemplary embodiment of the present disclosure, and FIG. 28 is a cross-sectional view that illustrates how fingerprint recognition is performed according to another exemplary embodiment of the present disclosure. Exemplary embodiments of FIGS. 23 through 28 differ from exemplary embodiments of FIGS. 8-9, and 13 through 16 in that a sensor layer is disposed below a substrate. Exemplary embodiments of FIGS. 23 through 28 will hereinafter be described, focusing mainly on differences with exemplary embodiments of FIGS. 8-9, and 13 through 16.

Referring to FIGS. 23 through 28, according to an exemplary embodiment, a sensor so layer SL_2 is disposed on the bottom surface of a substrate SUB. The bottom surface of the substrate SUB refers to a surface opposite to a top surface of the substrate SUB where TFTs 120 are disposed.

According to an exemplary embodiment, the sensor layer SL_2 includes a plurality of fingerprint detection sensors FPS, and the fingerprint detection sensors FPS correspond to peripheral areas SA. In response to a user's finger F being placed in contact with the top of a cover window CW, infrared light IR output from black matrices BM is reflected by ridges FR or valleys FV of the user's finger F, and the reflected infrared light is received by the fingerprint recognition sensors FPS disposed below the substrate SUB, so that the user's fingerprint pattern can be recognized.

According to an exemplary embodiment, the sensor layer SL_2 includes a light guide layer LL that facilitates reception of the infrared light IR reflected from the user's finger F. The light guide layer LL is disposed between the substrate SUB and the fingerprint recognition sensors FPS. The light guide layer LL includes a light guide path that focuses the infrared light IR reflected from the user's finger F on the fingerprint recognition sensors FPS. For example, the light guide path can be an optical fiber that includes a core that has a relatively high refractive index and a cladding wrapped around the core and that has a lower refractive index than the core, but embodiments of the present disclosure are not limited thereto. In another embodiment, the light guide path includes an opening. The light guide path corresponds to the fingerprint recognition sensors FPS.

According to an exemplary embodiment, when the sensor layer S L2 is disposed below the substrate SUB, processes can be simplified, the fingerprint recognition sensors FPS can be easily aligned with their surroundings, and any decrease in resolution can be prevented because the sensor layer SL_2 is not disposed in the output path of light.

Figure 29:
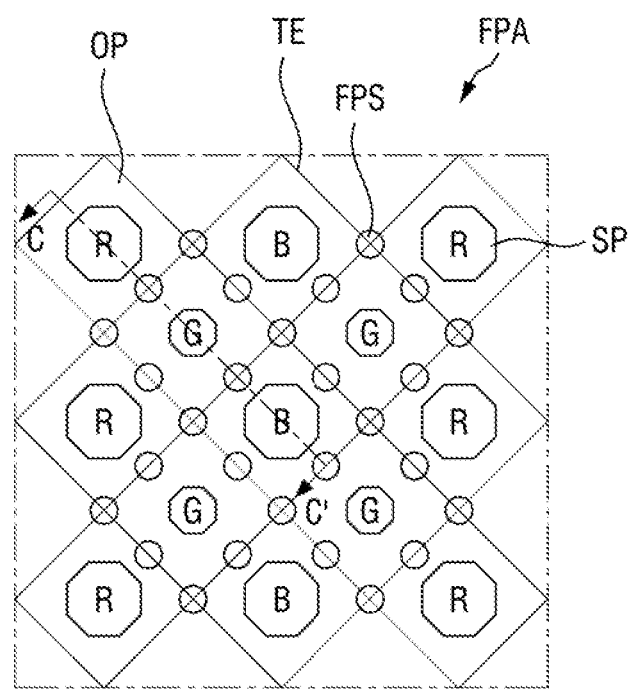
FIG. 29 is a plan view of a part of a fingerprint recognition area according to another exemplary embodiment of the present disclosure.
Figure 30:
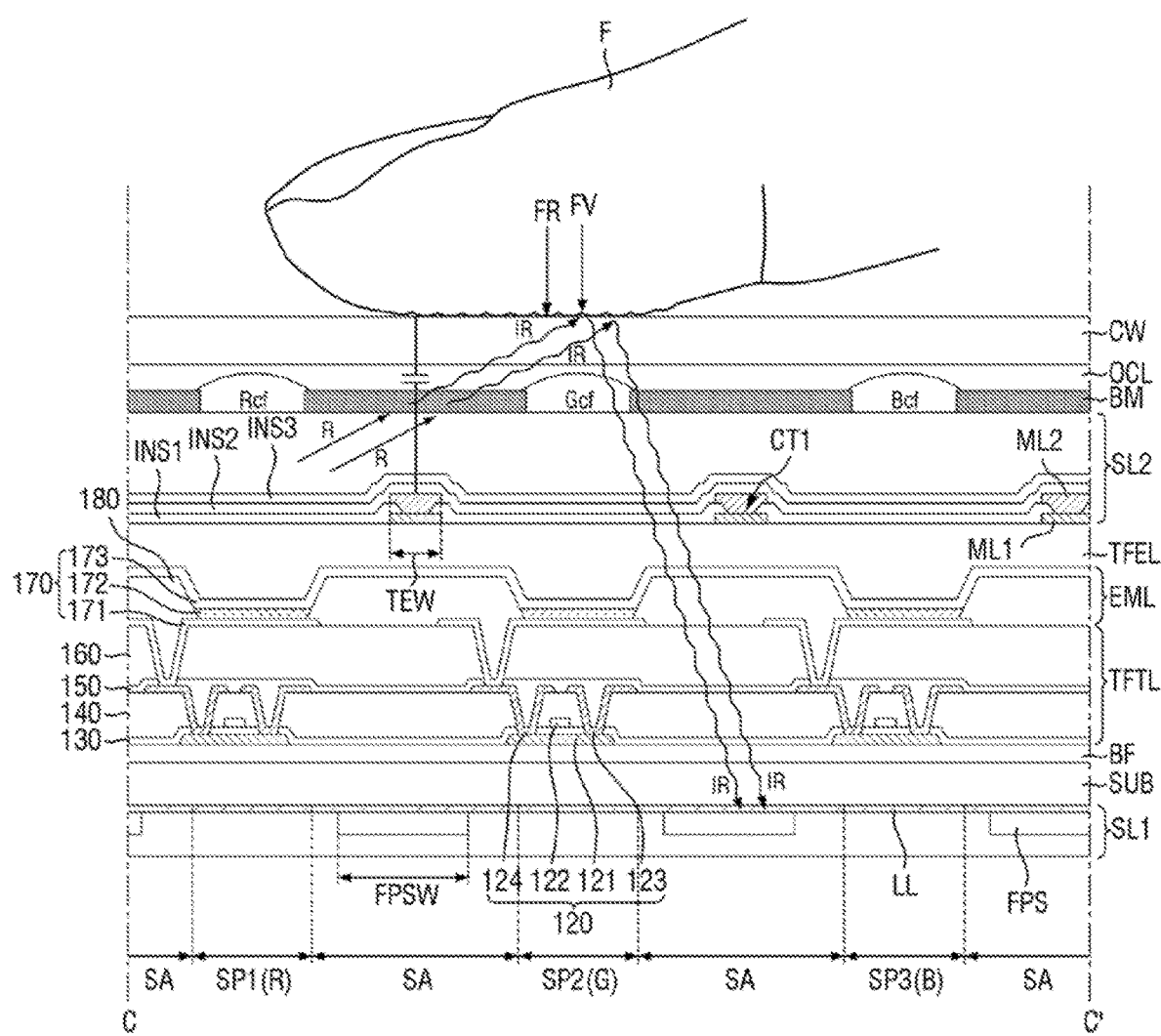
FIG. 30 is a cross-sectional view taken along line C-C' of FIG. 29.

FIG. 29 is a plan view that illustrates a part of a fingerprint recognition area according to another exemplary embodiment of the present disclosure, and FIG. 30 is a cross-sectional view taken along line C-C' of FIG. 29. An exemplary embodiment of FIGS. 29 and 30 differs from an exemplary embodiment of FIGS. 19 and 20 in that touch detection sensors are disposed in a different layer from fingerprint recognition sensors. An exemplary embodiment of FIGS. 29 and 30 will hereinafter be described, focusing mainly on difference with an exemplary embodiment of FIGS. 19 and 20. For convenience of description, FIGS. 29 and 30 illustrate a region where driving electrodes TE of touch detection sensors TDS are disposed, and the following description thereof refers to a region where sensing electrodes RE are disposed.

Referring to FIG. 29, according to an exemplary embodiment, a plurality of subpixels SP, driving electrodes TE of touch detection sensors TDS, and fingerprint recognition sensors FPS are disposed in a fingerprint recognition area FPA.

According to an exemplary embodiment, the driving electrodes TE are formed as mesh-type electrodes and include a plurality of openings OP, and the subpixels SP are disposed in the openings OP. The fingerprint recognition sensors FPS overlap with the driving electrodes TE. For example, the fingerprint recognition sensors FPS are disposed at the intersections of the driving electrodes TE.

Referring to FIG. 30, according to an exemplary embodiment, a first sensor layer SL1 that includes the fingerprint recognition sensors FPS is disposed below a substrate SUB, and a second sensor layer SL2 that includes the touch detection sensors TDS is disposed on a thin-film encapsulation layer TFEL.

According to an exemplary embodiment, the touch detection sensors TDS include the driving electrodes TE. The driving electrodes TE include first metal layers ML1 and second metal layers ML2. The first metal layers ML1 are disposed on the thin-film encapsulation layer TFEL.

According to an exemplary embodiment, a first insulating film INS1 is disposed on the so first metal layers ML1, and the second metal layers ML2 are disposed on the first insulating film INS1. The second metal layers ML2 are connected to the first metal layers ML1 via first contact holes CT1 and are formed of the same material as the first metal layers ML1.

According to an exemplary embodiment, second and third insulating films INS2 and INS3 are sequentially disposed on the second metal layers ML2, and connecting electrodes are disposed on the second insulating film INS2. A structure of the driving electrodes TE of FIGS. 29 and 30 is exemplary, and embodiments of the present disclosure are not limited thereto.

According to an exemplary embodiment, the fingerprint recognition sensors FPS of the first sensor layer SL1 and the driving electrodes TE of the second sensor layer SL2 are disposed in peripheral areas SA. The fingerprint recognition sensors FPS and the driving electrodes TE overlap, but embodiments of the present disclosure are not limited thereto.

In the peripheral areas SA, according to an exemplary embodiment, the fingerprint recognition sensors FPS, pixel defining films 180, driving electrodes TE, and black matrices BM are sequentially disposed.

According to an exemplary embodiment, a width FPSW of the fingerprint recognition sensors FPS is greater than a width TEW of the driving electrodes TE. When the first metal layers ML1 have a different width from the second metal layers M L2, of the wider of the widths of the first and second metal layers ML1 and ML2 is defined as the width TEW of the driving electrodes TE.

According to an exemplary embodiment, the width FPSW of the fingerprint recognition sensors FPS ranges from 8 μm to 10 μm, and the width TEW of the driving electrodes ranges from 3 μm to 3.5 μm. However, embodiments of the present disclosure are not limited thereto. Since the width TEW of the driving electrodes TE is less than the width FPSW of the fingerprint recognition sensors FPS, the fingerprint recognition sensors FPS can receive infrared light IR reflected by a user's finger F.

According to an exemplary embodiment, when the fingerprint recognition sensors FPS and the touch detection sensors TDS are disposed in different layers, the second openings OP2 of FIG. 19, which separate the fingerprint recognition sensors FPS from the driving electrodes TE or sensing electrodes RE of the touch detection sensors TDS, are not needed, and the arrangement of the driving electrodes TE and the fingerprint recognition sensors FPS can be simplified.

While exemplary embodiments of the present disclosure have been mainly described, they are not intended to limit embodiments of the present disclosure, and it will be understood by those of ordinary skill in the art that various modifications and applications which are not illustrated above can be made without departing from the essential characteristics of exemplary embodiments of the present invention. For example, components of exemplary embodiments of the present disclosure may be practiced with modifications. Further, differences relating to such modifications should be construed as being included in the scope of the disclosure as defined by the appended claims.

What is claimed is:

1. A display device, comprising:
   a substrate;
   a plurality of subpixels disposed on the substrate and that includes organic light-emitting elements that emit visible light;
   pixel defining films disposed between the subpixels that partition the subpixels;
   a layer of black matrices disposed on the pixel defining films, wherein the black matrices absorb visible light and emit infrared light; and
   a sensor layer that includes a plurality of fingerprint recognition sensors that receive infrared light emitted by the black matrices and reflected to from an external object, and touch electrodes that detect a touch input,
   wherein the sensor layer is disposed on the pixel defining films, and the layer of the black matrices is disposed on the sensor layer.

2. The display device of claim 1, wherein
   the sensor layer includes a plurality of fingerprint recognition sensors, and
   the fingerprint recognition sensors are infrared sensors.

3. The display device of claim 2, wherein the black matrices include quantum dots that convert visible light into infrared light.

4. The display device of claim 3, wherein an emission wavelength of the black matrices ranges from 800 nm to 2000 nm.

5. The display device of claim 3, wherein the black matrices include ZnGaGeO:Cr or LaGaO:Cr.

6. The display device of claim 2, wherein the sensor layer is disposed between the pixel defining films and the black matrices.

7. The display device of claim 6, wherein the fingerprint recognition sensors overlap the pixel defining films and the black matrices.

8. The display device of claim 6, wherein
   the sensor layer includes touch detection sensors, and
   the touch detection sensors include first touch electrodes and second touch electrodes.

9. The display device of claim 8, wherein the first touch electrodes and the second touch electrodes include first openings and second openings.

10. The display device of claim 9, wherein
    the first openings correspond to the subpixels, and
    the second openings correspond to the fingerprint recognition sensors.

11. The display device of claim 8, wherein the first touch electrodes and the second touch electrodes overlap the black matrices.

12. The display device of claim 11, wherein the first touch electrodes and the second touch electrodes are disposed in a same layer as the fingerprint recognition sensors.

13. A display device, comprising
a substrate;
a plurality of subpixels disposed on the substrate and that include organic light-emitting elements that emit visible light;
pixel defining films disposed between the subpixels that partition the subpixels;
a layer of black matrices disposed on the pixel defining films, wherein the black matrices absorb visible light and emit infrared light; and
a first sensor layer disposed below the substrate, wherein the first sensor layer includes a plurality of fingerprint recognition sensors that receive infrared light emitted by the black matrices and reflected from an external object,
wherein a fingerprint recognition sensor of the plurality of fingerprint recognition sensors, a pixel defining film of the pixel defining films, and a black matrix of the black matrices overlap each other in a thickness direction of the substrate.

14. The display device of claim 13, wherein
the first sensor layer includes a plurality of fingerprint recognition sensors, and
the fingerprint recognition sensors are infrared sensors.

15. The display device of claim 14, further comprising:
a second sensor layer disposed between the pixel defining films and the layer of black matrices and that includes touch detection sensors.

16. The display device of claim 15, wherein
the touch detection sensors include first touch electrodes and second touch electrodes, and the fingerprint recognition sensors, the first touch electrodes, and the second touch electrodes overlap the pixel defining films and the black matrices.

17. The display device of claim 16, wherein the fingerprint recognition sensors are wider that the first touch electrodes and are wider than the second touch electrodes.

18. The display device of claim 14, wherein the first sensor layer includes a light guide layer disposed between the substrate and the fingerprint recognition sensors.

19. A display device, comprising:
a substrate;
a light emitting layer disposed on the substrate that includes a plurality of subpixels that emit visible light;
a black matrix layer disposed on the light emitting layer that includes a plurality of black matrices disposed between the subpixels, wherein the black matrices absorb visible light and emit infrared light; and
a sensor layer disposed below black matrix layer, wherein the sensor layer includes a plurality of fingerprint recognition sensors that are infrared sensors that receive infrared light emitted by the black matrices and reflected from an external object, and touch electrodes that detect a touch input,
wherein the fingerprint sensors and the touch electrodes overlap the pixel defining films, and the fingerprint sensors and the touch electrodes are spaced apart from each other.

20. The display device of claim 19, further comprising:
pixel defining films disposed between the subpixels that partition the subpixels, wherein the black matrices are disposed on the pixel defining films; and
a layer of touch detection sensors that include first touch electrodes and second touch electrodes.

* * * * *